(12) United States Patent
Wei

(10) Patent No.: US 10,200,927 B2
(45) Date of Patent: *Feb. 5, 2019

(54) METHOD, EQUIPMENT AND SYSTEM FOR HANDING OVER CELL IN COMMUNICATION SYSTEM SUPPORTING CARRIER AGGREGATION

(71) Applicant: Sony Corporation, Tokyo (JP)

(72) Inventor: Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,224

(22) Filed: Sep. 5, 2017

(65) Prior Publication Data

US 2017/0367020 A1    Dec. 21, 2017

Related U.S. Application Data

(60) Continuation of application No. 15/489,620, filed on Apr. 17, 2017, now Pat. No. 9,775,084, which is a
(Continued)

(30) Foreign Application Priority Data

Jul. 27, 2010    (CN) .......................... 2010 1 0240506

(51) Int. Cl.
*H04L 5/00*    (2006.01)
*H04W 24/08*    (2009.01)
(Continued)

(52) U.S. Cl.
CPC ........... *H04W 36/165* (2013.01); *H04L 5/001* (2013.01); *H04L 5/0007* (2013.01);
(Continued)

(58) Field of Classification Search
CPC ..... H04W 36/08; H04W 76/19; H04W 76/27; H04W 36/165; H04W 24/10;
(Continued)

(56) References Cited

U.S. PATENT DOCUMENTS 8,526,964 B2    9/2013    Wei
8,792,381 B2    7/2014    Wei
(Continued)

FOREIGN PATENT DOCUMENTS

CN    101674586    3/2010
CN    101686472    3/2010
(Continued)

OTHER PUBLICATIONS

International Search Report dated Sep. 8, 2011 in PCT/CN11/75071 Filed Jun. 1, 2011.

*Primary Examiner* — Brandon J Miller
(74) *Attorney, Agent, or Firm* — Xsensus LLP

(57) ABSTRACT

A method, an equipment and a system for handing over a cell in a communication system supporting carrier aggregation. The method includes: when a terminal in the communication system moves to the edge of the currently serving cell, the terminal selects one or more neighbor cells from one or more neighbor cells as measurement objects according to the carrier aggregation manner of the one or more neighbor cells; the terminal measures the capabilities of the measurement objects, and obtains one or more measurement results; and the terminal sends a source base station which currently serving the terminal one or more measurement results as capability measurement reports of the one or more neighbor cells. Also provided are an equipment for handing over a cell in a communication system supporting carrier aggregation, a terminal including the said equipment and a communication system including the said terminal.

18 Claims, 11 Drawing Sheets

US 10,200,927 B2
Page 2

Related U.S. Application Data division of application No. 14/704,482, filed on May 5, 2015, now Pat. No. 9,756,538, which is a division of application No. 13/810,458, filed as application No. PCT/CN2011/075071 on Jun. 1, 2011, now Pat. No. 9,125,127.

(51) Int. Cl.

| | | |
|---|---|---|
| *H04W 24/10* | (2009.01) | |
| *H04W 36/08* | (2009.01) | |
| *H04W 36/16* | (2009.01) | |
| *H04W 36/30* | (2009.01) | |
| *H04W 36/38* | (2009.01) | |
| *H04W 72/00* | (2009.01) | |
| *H04W 72/08* | (2009.01) | |
| *H04W 74/08* | (2009.01) | |
| *H04W 76/19* | (2018.01) | |
| *H04W 76/27* | (2018.01) | |

(52) U.S. Cl.
CPC ........... *H04L 5/0091* (2013.01); *H04W 24/08* (2013.01); *H04W 24/10* (2013.01); *H04W 36/08* (2013.01); *H04W 36/30* (2013.01); *H04W 36/38* (2013.01); *H04W 72/082* (2013.01); *H04W 72/085* (2013.01); *H04W 74/0833* (2013.01); *H04W 76/19* (2018.02); *H04W 76/27* (2018.02); *H04W 72/00* (2013.01)

(58) Field of Classification Search
CPC ............... H04W 76/028; H04W 24/08; H04W 74/0833; H04W 76/046; H04W 72/082; H04W 72/085
See application file for complete search history.

(56) References Cited

U.S. PATENT DOCUMENTS

| | | | |
|---|---|---|---|
| 8,825,068 B2 | 9/2014 | Wei | |
| 8,831,615 B2 | 9/2014 | Wei | |
| 9,014,141 B2 | 4/2015 | Kim | |
| 9,125,127 B2 * | 9/2015 | Wei | ........ H04L 5/0007 |
| 9,210,637 B2 * | 12/2015 | Wei | ........ H04W 36/0088 |
| 9,439,111 B2 * | 9/2016 | Wei | ........ H04W 36/0033 |
| 9,736,741 B2 * | 8/2017 | Wei | ........ H04W 36/0088 |
| 9,756,538 B2 * | 9/2017 | Wei | ........ H04W 36/165 |
| 9,775,084 B2 * | 9/2017 | Wei | ........ H04W 36/08 |
| 2010/0272091 A1 | 10/2010 | Fabien | |
| 2010/0303039 A1 | 12/2010 | Zhang et al. | |
| 2010/0317360 A1 | 12/2010 | McBeath | |
| 2010/0322079 A1 * | 12/2010 | Kitazoe | ........ H04W 36/0088 370/241 |
| 2011/0028148 A1 * | 2/2011 | Lee | ........ H04L 5/003 455/435.2 |
| 2011/0170496 A1 | 7/2011 | Fong | |
| 2011/0275374 A1 | 11/2011 | Narasimha | |
| 2012/0214540 A1 | 8/2012 | Narasimha | |
| 2012/0275390 A1 | 11/2012 | Korhonen | |
| 2012/0294694 A1 | 11/2012 | Garot | |
| 2013/0058245 A1 | 3/2013 | Van Lieshout | |
| 2013/0208601 A1 | 8/2013 | Cui | |
| 2013/0343324 A1 | 12/2013 | Lin | |

FOREIGN PATENT DOCUMENTS

| | | |
|---|---|---|
| CN | 101730164 | 6/2010 |
| CN | 101742599 | 6/2010 |
| EP | 2 190 241 | 5/2010 |
| WO | WO 2009/046776 A1 | 4/2009 |

\* cited by examiner

METHOD, EQUIPMENT AND SYSTEM FOR HANDING OVER CELL IN COMMUNICATION SYSTEM SUPPORTING CARRIER AGGREGATION

CROSS-REFERENCE TO RELATED APPLICATIONS

This application is a continuation application of U.S. application Ser. No. 15/489,620, filed Apr. 17, 2017, herein incorporated by reference, and claims the benefit of priority under 35 U.S.C. § 120 from, U.S. application Ser. No. 14/704,482, filed May 5, 2015, herein incorporated by reference, which is a divisional application of U.S. application Ser. No. 13/810,458, filed Jan. 16, 2013, which is a National Stage Application of International Application No. PCT/CN11/075071, filed Jun. 1, 2011, which is based upon and claims the benefit of priority from prior China Patent Application No. 201010240506.1, filed Jul. 27, 2010.

FIELD

The invention relates to the field of communications supporting carrier aggregation (CA), and particularly to methods and apparatuses for cell handover in a communication system supporting carrier aggregation, and terminal devices, base stations and communication systems including such apparatuses or using such methods.

BACKGROUND

The future LTE-A (Long Term Evolution-Advanced) system supports a transmission bandwidth up to 100 MHz, while in the current LTE standard the maximum supportable transmission bandwidth is 20 MHz such that a plurality of carriers need to be aggregated for broader bandwidth transmission. Carrier aggregation is a technique presented by 3GPP to support the higher requirement for transmission bandwidth in the future mobile communication system, in which a plurality of carriers are aggregated for transmission. The introduction of the CA technique brings about new chances and challenges for the development of the communication techniques.

SUMMARY

A communication system which supports CA, such as LTE-A, can support various CA scenarios, for example, consecutive CA and non-consecutive CA scenarios. This results in the diversity of the scenarios when a terminal device in a communication system is handed over between cells. Due to such diversity, a single handover algorithm cannot be applied to all the scenarios. Some embodiments of the invention provide a scheme of adaptively selecting the cell handover algorithms based on the CA scenario in which a terminal device is located when the terminal device is to be handed over. Particularly, some embodiments of the invention methods and apparatuses for cell handover in a communication system supporting CA, and terminal devices, base stations and communication systems including such apparatuses or using such methods.

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

According to an aspect of the invention, there is provided a method for cell handover in a communication system supporting carrier aggregation, which may include: selecting, by a terminal device in the communication system when the terminal device moves to edge of a currently serving cell, one or more from one or more neighbor cells based on carrier aggregation manners of the one or more neighbor cells, as objects to be measured; measuring, by the terminal device, performances of the objects to be measured to obtain one or more measurement results; and transmitting, by the terminal device, the one or more measurement results to a source base station currently serving the terminal device, as a performance measurement report of the one or more neighbor cells.

According to another aspect of the invention, there is provided an apparatus for cell handover, configured in a terminal device in a communication system supporting carrier aggregation and including: a measurement object selecting device, configured to select, when the terminal device moves to edge of a currently serving cell, one or more from one or more neighbor cells based on carrier aggregation manners of the one or more neighbor cells, as objects to be measured; a cell measuring device, configured to measure performances of the objects to be measured to obtain one or more measurement results; and a transmitting device, configured to transmit the one or more measurement results obtained by the cell measuring device to a source base station currently serving the terminal device, as a performance measurement report of the one or more neighbor cells.

According to another aspect of the invention, there is provided a terminal device in a communication system supporting carrier aggregation. The terminal device may include the above apparatus for cell handover.

According to another aspect of the invention, there is provided a method for cell handover in a communication system supporting carrier aggregation. The method includes: selecting, by a source base station when receiving a performance measurement report of one or more neighbor cells from a terminal device served by the source base station, an algorithm suitable to the carrier aggregation manners of one or more candidate base stations corresponding to the one or more neighbor cells based on the performance measurement report and based on the carrier aggregation manners to calculate priorities of the one or more candidate base stations; selecting one having highest priority from the one or more candidate base stations, as a destination base station; and selecting one or more cells to be accessed for the terminal device from all cells belonging to the destination base station in the one or more neighbor cells.

According to another aspect of the invention, there is provided an apparatus for cell handover, configured in the base station of the communication system supporting carrier aggregation and including: a receiving device configured to receive a performance measurement report of one or more neighbor cells from a terminal device served by the base station; a priority determining device configured to select an algorithm suitable to the carrier aggregation manners of one or more candidate base stations corresponding to the one or more neighbor cells based on the performance measurement report and based on the carrier aggregation manners to calculate priorities of the one or more candidate base stations; a destination base station selecting device configured to select one having highest priority from the one or more candidate base stations, as a destination base station; and a cell selecting device configured to select one or more cells to be accessed for the terminal device from all cells belonging to the destination base station in the one or more neighbor cells.

According to another aspect of the invention, there is provided a base station in a communication system supporting carrier aggregation. The base station includes the above apparatus for cell handover.

According to another aspect of the invention, there is provided a method for cell handover in a communication system supporting carrier aggregation. The method includes: judging, by a source base station in the communication system, whether or not the component carriers corresponding to one or more cells to be accessed belonging to a destination base station selected by a terminal device which is served by the source base station and is to be handed over are in a same frequency band, and if yes, packaging configuration information of all the cells to be accessed in a handover command for initiating the handover of the terminal device, otherwise, packaging configuration information of one of the cells to be accessed in the handover command; and transmitting the handover command.

According to another aspect of the invention, there is provided an apparatus for cell handover, configured in a base station in the communication system supporting carrier aggregation and including: a demand forming device configured to judge whether or not the component carriers corresponding to one or more cells to be accessed belonging to a destination base station selected by a terminal device which is served by the present base station and is to be handed over are in a same frequency band, and if yes, package configuration information of all the cells to be accessed in a handover command for initiating the handover of the terminal device, otherwise, package configuration information of one of the cells to be accessed in the handover command; and a transmitting device configured to transmit the handover command.

According to another aspect of the invention, there is provided a base station in a communication system supporting carrier aggregation. The base station includes the above apparatus for cell handover.

According to another aspect of the invention, there is provided a method for cell handover in a communication system supporting carrier aggregation. The method includes: selecting, by a terminal device in the communication system when the terminal device moves to edge of a currently serving cell, one or more from one or more neighbor cells based on carrier aggregation manners of the one or more neighbor cells, as objects to be measured; measuring, by the terminal device, performances of the objects to be measured to obtain one or more measurement results; transmitting, by the terminal device, the one or more measurement results to a source base station currently serving the terminal device, as a performance measurement report of the one or more neighbor cells; selecting, by the source base station when receiving the performance measurement report from the terminal device, an algorithm suitable to the carrier aggregation manners of one or more candidate base stations corresponding to the one or more neighbor cells based on the performance measurement report and based on the carrier aggregation manners to calculate priorities of the one or more candidate base stations; selecting one having highest priority from the one or more candidate base stations, as a destination base station; and selecting one or more cells to be accessed for the terminal device from all cells belonging to the destination base station in the one or more neighbor cells.

According to another aspect of the invention, there is provided a method for cell handover in a communication system supporting carrier aggregation. The method includes: selecting, by a terminal device in the communication system when the terminal device moves to edge of a currently serving cell, one or more from one or more neighbor cells based on carrier aggregation manners of the one or more neighbor cells, as objects to be measured; measuring, by the terminal device, performances of the objects to be measured to obtain one or more measurement results; transmitting, by the terminal device, the one or more measurement results to a source base station currently serving the terminal device, as a performance measurement report of the one or more neighbor cells; selecting, by the source base station when receiving the performance measurement report from the terminal device, one from one or more candidate base stations corresponding to the one or more neighbor cells based on the performance measurement report, as a destination base station, and selecting one or more cells to be accessed for the terminal device from all cells belonging to the destination base station in the one or more neighbor cells; if component carriers corresponding to the cells to be accessed are in a same frequency band, packaging configuration information of all the cells to be accessed in a handover command for initiating cell handover; otherwise, packaging configuration information of one or more among the cells to be accessed in the handover command; and transmitting the handover command.

According to another aspect of the invention, there is provided a communication system supporting carrier aggregation, including the above terminal device and/or the above base station.

In addition, some embodiments of the disclosure further provide computer program for realizing the above methods.

Further, some embodiments of the disclosure further provide computer program products in at least the form of computer-readable medium, upon which computer program codes for realizing the above methods are recorded.

BRIEF DESCRIPTION OF DRAWINGS

The above and other objects, features and advantages of the embodiments of the disclosure can be better understood with reference to the description given below in conjunction with the accompanying drawings, throughout which identical or like components are denoted by identical or like reference signs. In addition the components shown in the drawings are merely to illustrate the principle of the disclosure. In the drawings.

DETAILED DESCRIPTION

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

Some embodiments of the present disclosure provide a scheme of adaptively selecting the cell handover algorithms based on the CA scenario in which a terminal device is located when the terminal device is to be handed over. In the disclosure, a base station (BS) to which a currently serving cell of a terminal device belongs is referred to as a source base station (i.e. a base station currently serving the terminal device), a base station to which a neighbor cell of the terminal device belongs is referred to a candidate destination base station or a candidate base station, and a base station to which a cell, to which the terminal device is finally handed, belongs is referred to as a destination base station. The so-called neighbor cell refers to a cell whose coverage is adjacent to that of the currently serving cell of a terminal device, which may be detected by the terminal device when the terminal device moves to the edge of the coverage of the currently serving cell.

Figure 1:
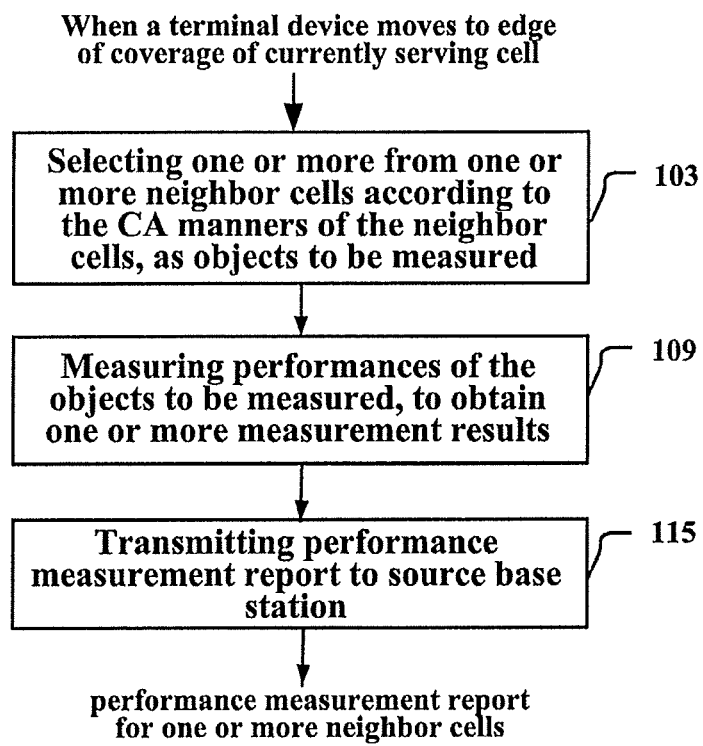
FIG. 1 is a schematic flow chart showing a method of cell handover for a terminal device in a communication system according to an embodiment of the invention.

FIG. 1 shows a method of a terminal device being handed over between cells in a communication system supporting CA according to an embodiment of the invention.

When a terminal device is to perform cell handover, the terminal device needs to measure the performances of its neighbor cells. At this time, the terminal device is located at the edge of the coverage of the currently serving cell, and may detect one or more neighbor cells at the same time. These neighbor cells may belong to different candidate base stations which may support various carrier aggregation manners. With the different carrier aggregation manners, these neighbor cells may present different characteristics. In the embodiment shown in FIG. 1, the terminal device selects a part or all of the neighbor cells as the object to be measured, based on the different characteristics of these neighbor cells under the different carrier aggregation manners.

As shown in FIG. 1, the method may include step 103, step 109 and step 115.

In step 103, based on the detected carrier aggregation manners of one or more neighbor cells, one or more are selected from one or more neighbor cells, as the objects to be measured. In other words, the objects to be measured are selected by using the different characteristics of these neighbor cells under different carrier aggregation manners, rather than simply measuring all the neighbor cells. As an example, the selection of the object to be measured may be performed by the source base station of the terminal device, and then the result of the selection may be notified to the terminal device by the source base station; as another example, the selection of the object to be measured may be performed by the terminal device.

In step 109, the terminal device measures the performances of one or more objects to be measured obtained at step 103, to obtain one or more measurement results. In step 115, the terminal device forms the performance measurement report of one or more neighbor cells by using these measurement results, and transmits the performance measurement report to the source base station.

By using the method shown in FIG. 1, the number of cells to be measured may be reduced, thereby reducing the measurement load of the terminal device and improving the processing speed.

It shall be noted that the terminal device may measure the performance of a cell by using any appropriate method and the performance of a cell may be characterized by any one or more appropriate performance parameters, as the measurement result of the cell. In the disclosure the description of the particular measuring method and performance parameters is omitted. The measured performance parameters of a cell are collectively referred to as the performance of the cell.

Figure 2:
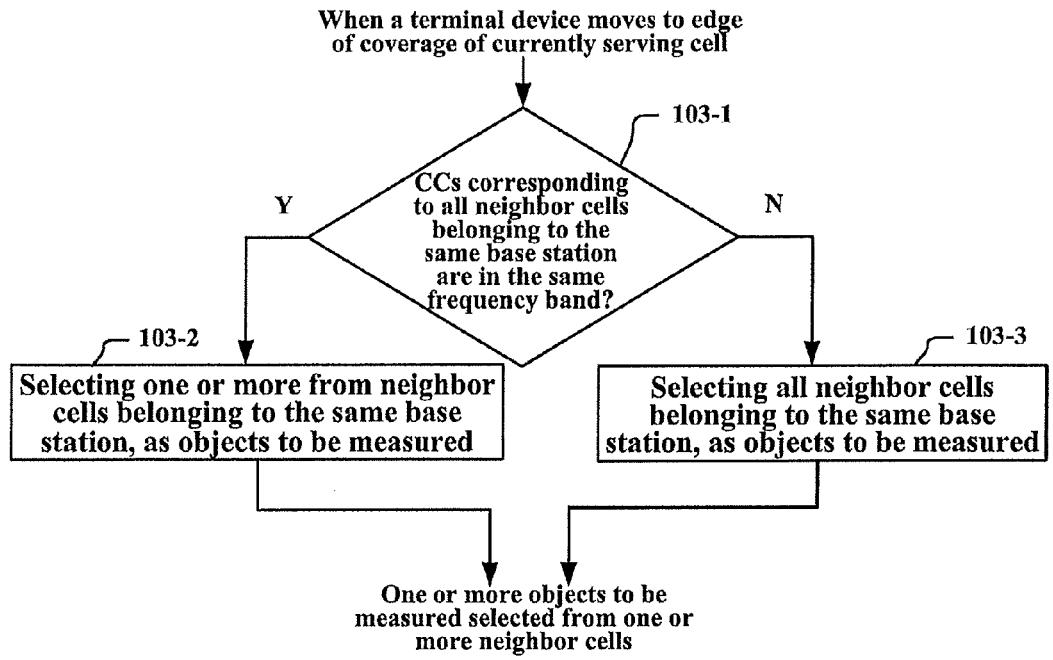
FIG. 2 is a schematic flow chart showing a method of a terminal device selecting an object to be measured according to an embodiment of the invention.

FIG. 2 shows a method of selecting an object to be measured from one or more neighbor cells according to another embodiment of the invention. In consecutive carrier aggregation scenario, the component carriers (CCs) corresponding to the neighbor cells belonging to a candidate base station are located in the same frequency band, and thus these component carriers have similar propagation characteristics. By using such characteristics, one neighbor cell may be selected from the neighbor cells belonging to the candidate base station, as the object to be measured. The measurement result of the object may be used as the measurement result of all the neighbor cells belong to the candidate base station.

As shown in FIG. 2, in step 103-1, it is determined whether the component carriers corresponding to the neighbor cells belonging to the same base station among one or more neighbor cells are located in the same frequency band. That is, it is judged first whether the neighbor cells belonging to the same base station are of consecutive carrier aggregation manner. If yes, in step 103-2 one or more (preferably, one) are selected from the neighbor cells belonging to the same base station, as the objects to be measured. If not, in step 103-3 all of the neighbor cells belonging to the same base station are determined as the objects to be measured. Particularly, if only one neighbor cell belongs to a candidate base station, this neighbor cell is determined as the object to be measured. If a plurality of neighbor cells belongs to a candidate base station and these neighbor cells are in different frequency bands, all the neighbor cells belonging to the candidate base station are determined as the objects to be measured. If a plurality of neighbor cells belongs to a candidate base station and these neighbor cells are in the same frequency bands, it is not necessary to use all the neighbor cells belonging to the candidate base station as the objects to be measured. The steps in FIG. 2 may be performed by a terminal device that performs cell hand over or may be performed by the source base station of the terminal device.

In the embodiment of FIG. 2, the spectrum features and propagation features of the cell in consecutive carrier aggregation manner are taken advantage of to reduce the number of neighbor cells to be measured, thereby significantly reduce the measurement load of the terminal device. In other embodiment or example, the object to be measured may be selected by using other appropriate characteristics of a neighbor cell in other type of carrier aggregation manner, which are not numerated herein.

It shall be noted that the above method of selecting an object to be measured may be applied to other embodiments of the method for cell handover described above and to be described below.

In some embodiments, before sending the measurement results to the source base station, the terminal device may further perform a selection among these measurement results according to some conditions. Only the measurement results which meet the conditions will be sent to the source base station. In this way the number of measurement results to be processed by the communication system may be reduced, thereby reducing the transmission load on the communication channel and the processing load of the source base station. FIGS. 3-6 respectively shows some particular embodiments of the method of optimizing the measurement results by the terminal device.

Figure 3:
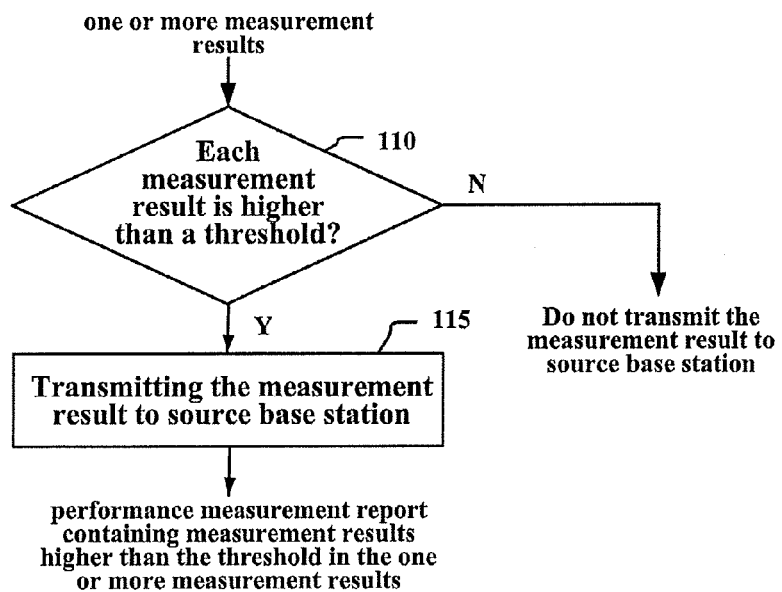
FIG. 3 is a schematic flow chart showing a method of filtering the measure results by a terminal device before sending a performance measurement report to a source base station according to an embodiment of the invention.

In the embodiment of FIG. 3, the terminal device sets a transmission threshold for the measurement results, to reduce the number of measurement reports to be processed, thereby reducing the transmission load on the communication channel and the processing load of the source base station. As shown in FIG. 3, in step 110 the terminal device determines whether each of one or more measurement results is higher than a threshold, and if yes, the terminal device transmits the measurement result to the source base station in step 115, particularly, it may include the measurement result in the performance measurement report to be transmitted to the source base station. If a measurement result is lower than the threshold, the terminal device does not send the measurement result to the source base station, e.g. the measurement result will not be included in the performance measurement report to be sent to the source base station. It shall be noted that the above threshold may be set as actual requirements, e.g. may be set based on the measured performance parameters or the actual communication scenarios, the description of which is omitted herein. As an example, the above threshold may be a value set for the terminal device by the system or base station, or may be a value determined by the terminal device based on the actual application scenario. As another example, the above threshold may be pre-provided in the terminal device.

Figure 4:
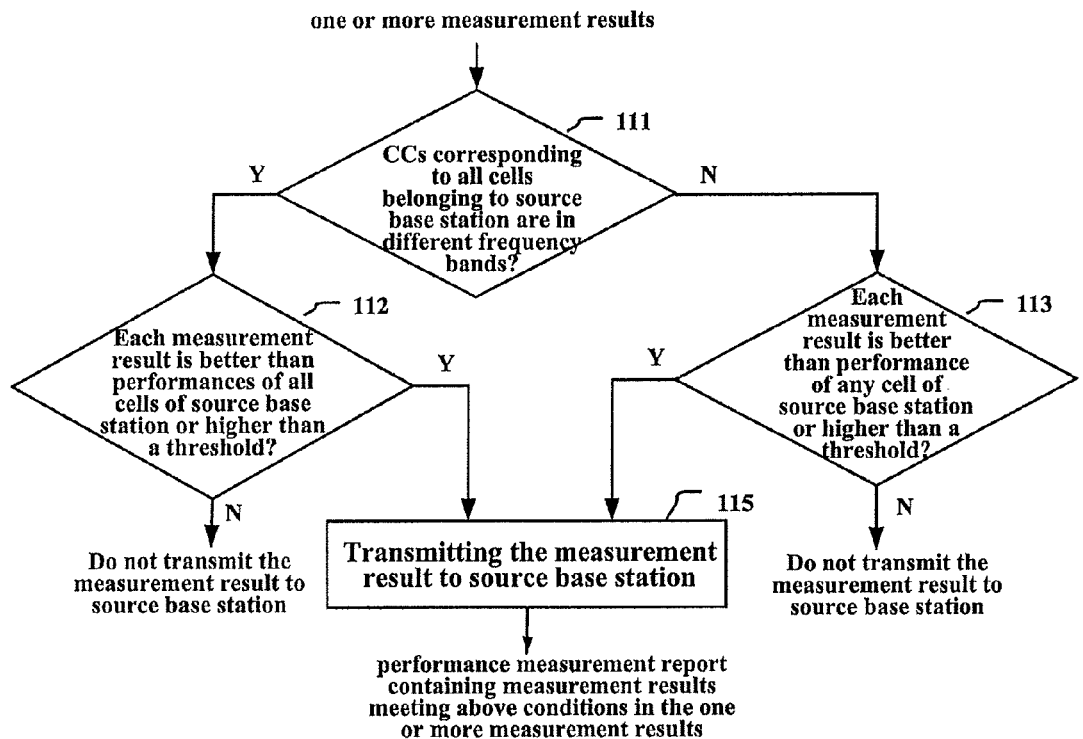
FIG. 4 is a schematic flow chart showing a method of filtering the measure results by a terminal device before sending a performance measurement report to a source base station according to another embodiment of the invention.

In the embodiment shown in FIG. 4, the terminal device or its source base station specifies the object to be compared with the measurement results based on the carrier aggregation manner of the source base station, so that the method of selecting the measurement results may be adapted to the actual communication scenario. In addition the transmission of the measurement report may be optimized. Particularly, when the source base station is of consecutive carrier aggregation manner, due to the similar propagation characteristics of the component carriers in the same frequency band, any one of the cells of the source base station may be used as the object to be compared and may be measured, thereby reducing the measurement and processing load of the terminal device and improving the processing speed. In the case that the source base station is of non-consecutive carrier aggregation manner, the propagation characteristics of the cells are different from each other since the component carriers of the cells are located in different frequency bands. In this case, all the cells of the source base station may be used as the objects to be compared and may be measured. As shown in FIG. 4, in step 111 the terminal device or the source base station determines whether the component carriers corresponding to all the cells of the source base station (or all the cells to which the terminal device is connected) are located in different frequency bands.

If the determining result of step 111 is YES, in step 112 the terminal device compares each measurement result with the performances of all the cells of the source base station, or compares each measurement result with a threshold value (Similar to the embodiment shown in FIG. 3, the threshold value may be predetermined by the system, or the base station or the terminal device, or may be determined based on actual application scenario by the system, or the base station or the terminal device, the description of which is omitted herein). If a measurement result is better than the performances of all the cells of the source base station or is higher than the threshold value, in step 115 the terminal device may send the measurement result to the source base station, otherwise, the terminal device does not send the measurement result to the source base station.

If the determining result of step 111 is NO, i.e. if the component carriers corresponding to al the cells of the source base station are located in the same frequency band, in step 112 the terminal device compares each measurement result with the performance of any of all the cells of the source base station, or may compare each measurement result with a threshold value ((Similar to the embodiment shown in FIG. 3, the threshold value may be predetermined by the system, or the base station or the terminal device, or may be determined based on actual application scenario by the system, or the base station or the terminal device, the description of which is omitted herein). If a measurement result is better than the performance of any cell randomly selected from all the cells of the source base station or is higher than the threshold value, in step 115 the terminal device may send the measurement result to the source base station, otherwise, the terminal device does not send the measurement result to the source base station.

Figure 5:
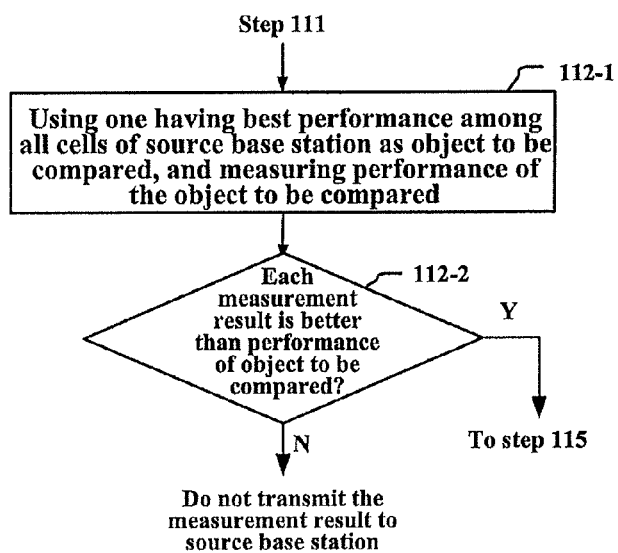
FIG. 5 is a schematic flow chart showing an method of object comparison in order to filter the measure results by a terminal device according to an embodiment of the invention.
Figure 6:
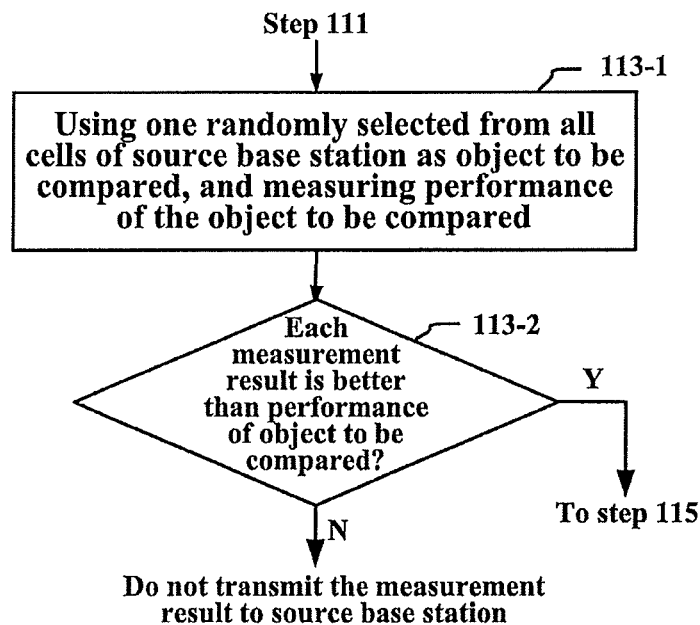
FIG. 6 is a schematic flow chart showing an method of object comparison in order to filter the measure results by a terminal device according to another embodiment of the invention.

As an example, the terminal device may compare a measurement result with the performances of the cells of the source base station by using the following method shown in FIG. 5 or FIG. 6.

As shown in FIG. 5, the method of comparing a measurement result of a neighbor cell with the performances of all the cells of the source base station (step 112 as shown in FIG. 4) may include steps 112-1 and 112-2. In step 112-1, one cell which has the best performance among all the cells of the source base station (all the cells of the source base station to which the terminal device is connected) is used as the object to be compared. The terminal device measures the performance of the object to be compared. In step 112-2, the terminal device compares each measurement result with the performance of the cell having the best performance. By using the method of FIG. 5, the terminal device needs not to compare the measurement results with the performances of all the cells of the source base station. In this way, the processing load of the terminal device is reduced and processing speed is improved. As an example, the cell having the best performance among all the cells to which the terminal device is currently connected may be specified by the source base station, e.g. based on the performance data stored in the base station, and may be notified to the terminal device by the source base station. As another example, the terminal device may select the cell having the best performance from all the cells to which it is connected based on the performance data stored by the terminal device or based on the history measurement result stored by it, or alternatively, the terminal device may measure all the cells to which it is currently connected, and select one having the best performance there from as the object to be compared.

As shown in FIG. 6, the method of comparing a measurement result of a neighbor cell with the performance of any one cell of the source base station (i.e. step 113 shown in FIG. 4) may include steps 113-1 and 113-2. In step 113-1, one cell is randomly selected from all the cells of the source base station (all the cells to which the terminal device is currently connected) as an object to be compared. The performance of the object may be measured. In step 113-2, the terminal device compares each measurement result with the performance of the randomly selected cell. By using the method of FIG. 6, the terminal device needs to measure only the performance of one cell of the source base station. In this way the measurement and processing load of the terminal device can be reduced and the processing speed can be improved. As an example, the source base station may randomly specify one of all the cells, to which the terminal device is currently connected, as the object to be compared, and notify the specified object to the terminal device. As another example, the terminal device may randomly select one cell from all the cells, to which the terminal device is currently connected, as the object to be compared.

It shall be noted that the methods of processing the measurement results in the embodiments/examples in FIGS. 3-6 may be applied to other embodiments of the method for cell handover of the disclosure.

Figure 7:
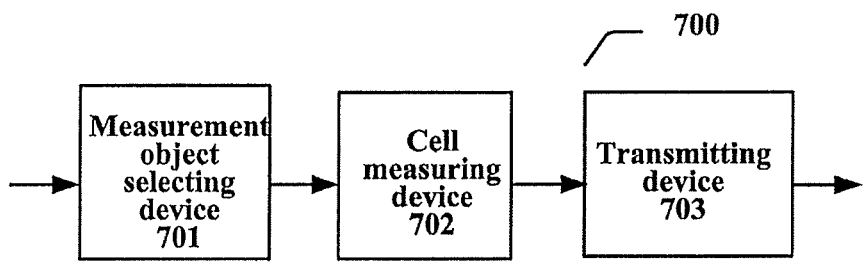
FIG. 7 is a schematic block diagram showing the structure of an apparatus for cell handover according to an embodiment of the invention.
Figure 8:
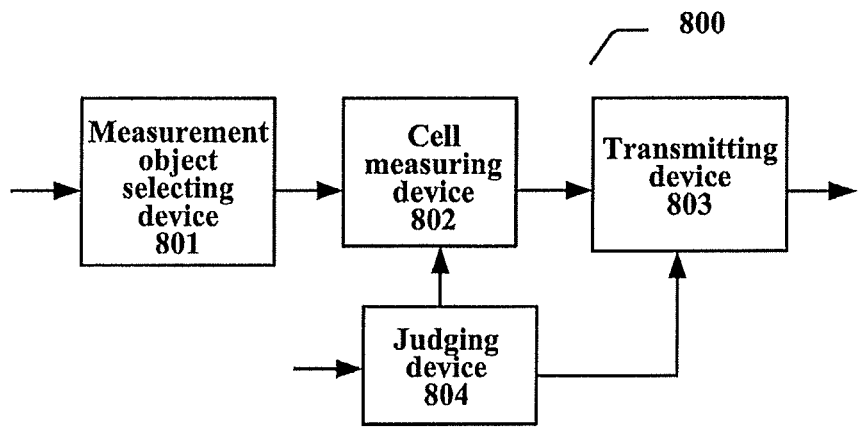
FIG. 8 is a schematic block diagram showing the structure of an apparatus for cell handover according to another embodiment of the invention.

FIG. 7 and FIG. 8 each show an apparatus which realizes the method shown in the above embodiments/example. The apparatus 700 or 800 shown in FIG. 7 or FIG. 8 may be configured in a terminal device (not shown) of a communication system supporting carrier aggregation.

As shown in FIG. 7, the apparatus for cell handover 700 includes a measurement object selecting device 701, a cell measuring device 702 and a transmitting device 703.

When the terminal device moves to the edge of the coverage of the currently serving cell, the measurement object selecting device 701 is configured to select one or more from one or more detected neighbor cells based on the carrier aggregation manners of the one or more detected neighbor cells, as the objects to be measured.

The cell measuring device 702 is configured to measure the performances of the one or more selected objects to be measured, to obtain one or more measurement results. The transmitting device 703 is configured to form a performance measurement report of the one or more neighbor cells based on measurement results obtained by the cell measuring device 702, and transmit the performance measurement report to the source base station currently serving the terminal device.

Similar to the method embodiment of FIG. 1, the apparatus 700 selects the objects to be measured by using the different characteristics of the detected neighbor cells, in stead of simply measuring all the neighbor cells. In this way, the number of cells to be measured may be reduced, thereby reducing the measurement load of the terminal device and improving the processing speed.

As shown in FIG. 8, the apparatus 800 for cell handover includes a measurement object selecting device 801, a cell measuring device 802 and a transmitting device 803. The difference from that shown in FIG. 7 lies in that, the apparatus 800 for cell handover further includes a judging device 804.

The measurement object selecting device 801, the cell measuring device 802 and the transmitting device 803 are respectively similar to those devices 701, 702, and 703 in FIG. 7, the description of which is not repeated. The judging device 804 is configured to judge whether each measurement result obtained by the cell measuring device 801 is higher than a threshold value, and if yes, instruct the transmitting device 803 to transmit the measurement result to the source base station, otherwise, do not instruct the transmitting device 803 to transmit the measurement result to the source base station.

In the embodiment of FIG. 8, the apparatus 800 sets a transmission threshold for the measurement results, in order to reduce the number of measurement reports to be processed, thereby reducing the transmission load on the transmission channel and the processing load of the source base station.

In another embodiment, the judging device 804 may further select the object to be compared with the measurement results according to the carrier aggregation manner of the source base station. Particularly, the judging device 804 may firstly determine whether the component carriers corresponding to all the cells of the source base station are located in different frequency bands. If the component carriers corresponding to all the cells of the source base station are located in different frequency bands, the judging device 804 further judges whether each measurement result obtained by the cell measuring device 802 is better than the performances of all the cells of the source base station or is higher than a threshold value, and if yes, instructs the transmitting device 803 to transmit the measurement result to the source base station, otherwise, does not instruct to transmit the measurement result to the source base station. If it is determined that the component carriers corresponding to all the cells of the source base station are located in the same frequency band, the judging device further judges whether each measurement result obtained by the cell measuring device 802 is better than the performance of a cell randomly selected from all the cells of the source base station or is higher than a threshold value, and if yes, instructs the transmitting device 803 to transmit the measurement result to the source base station, otherwise, does not instruct to transmit the measurement result to the source base station. In this way, the selection of the measurement results may be adapted to the actual communication scenario, thereby further optimizing the transmission of the measurement report. In the case of consecutive carrier aggregation manner, any one cell is selected randomly form the cells of the source base station as the object t be compared and is measured, which may reduce the measurement and processing load of the terminal device and improve the processing speed.

As an example, the apparatus 800 may compare a measurement result with the performances of the cells of the source base station by using the above method shown in FIG. 5 or FIG. 6. For example, the cell measuring device 802 may measure the performances of all the cells of the source base station and return the results to the judging device 804. The judging device 804 may select one cell having the best performance from all the cells of the source base station based on the performances of all the cells measured by the cell measuring device, and compare each measurement result with the performance of the cell having the best performance. In this way, the apparatus 800 needs not to compare the measurement results with the performances of all the cells of the source base station. Thus the processing load of the apparatus can be reduced and the processing speed can be accelerated. For another example, the cell measuring device 802 may measure the performance of a cell randomly selected from all the cells of the source base station; and the judging device 804 may compare the measurement results of the neighbor cells with the performance of the randomly selected cell. In this way, the apparatus 800 needs only to measure the performance of one cell of the source base station. Thus, the measurement and processing load can be reduced and the processing speed can be accelerated.

Similar to the above method embodiments and examples, in the above apparatus embodiments and examples the threshold value may be set by the system (or base station) or by the terminal device as practical requirements, the description of which is not repeated.

Similar to the above method embodiments, the apparatus 700 or 800 may measure the performance of a cell by using any appropriate method and the performance of the cell may be characterized by any appropriate performance parameters, the description of which is omitted herein.

As an example, the measurement object selecting device 701 or 801 may further judge the component carriers corresponding to the neighbor cells belonging to the same base station among the one or more detected neighbor cells are located in different frequency bands; and if yes, select one neighbor cell randomly as the object to be measured, otherwise, use all the neighbor cells belonging to the same base station as the object to be measured. In this example, the spectrum characteristic and propagation characteristic of the cells of the consecutive carrier aggregation manner are taken into account, to reduce the number of neighbor cells to be measured, and thus reduce the measurement load of the terminal device. In other embodiment or example, the measurement object selecting device 701 or 801 may select the objects to be measured by using other appropriate characteristics of the neighbor cells in other types of CA scenarios, which are not numerated herein Some embodiments of the invention further provide terminal devices in the communication system supporting carrier aggregation. The terminal device may include the apparatus for cell handover in the above embodiments or examples, or may use the method of cell handover in the above embodiments or examples, the description of which is not repeated.

In addition, in the embodiments described above with reference to FIGS. 7-8, the object to be measured is selected at the side of the terminal device. Selecting the object to be measured by the terminal device (in stead of the source base station) can reduce the communication overhead between the base station and the terminal device, and thus the processing speed and efficiency can be improved. According to another embodiment, there is provided a base station (not shown) including the above apparatus for cell handover, the apparatus for cell handover of the base station may include a measurement object determining device which is configured to select one or more from one or more neighbor cells detected by a terminal device served by the base station based on the carrier aggregation manners of the one or more neighbor cells, as the objects to be measured. Accordingly, the embodiment further provides a method of cell handover at the side of the base station. The method may include: selecting one or more from one or more neighbor cells detected by a terminal device served by the base station based on the carrier aggregation manners of the one or more neighbor cells, as the objects to be measured; and notifying the objects to be measured to the terminal device. Particularly, the base station (for example, by using the measurement object determining device) firstly determines whether the component carriers corresponding to the neighbor cells belonging to the same base station among the one or more neighbor cells are located in the same frequency band; if yes, selects one or more (preferably, one) from the neighbor cells belonging to the same base station as the objects to be measured, if not, uses all the neighbor cells belonging to the same base station as the objects to be measured. Then the transmitting device of the base station notifies the objects to be measured to the terminal device. As an example, the measurement object determining device may be incorporated in the apparatus for cell handover at the base station side according to the embodiments or examples to be described blow. In addition, the method of selecting an object to be measured by a base station may be incorporated in the method for cell handover performed at the base station side according to the embodiments or examples to be described blow.

The methods and apparatuses of selecting a destination base station and a cell to be accessed at the base station side in the communication system supporting carrier aggregation, as well as a base station and a communication system including such an apparatus.

In conventional single carrier communication system, a terminal device is connected to only one cell at the same time. When performing cell handover, a unique cell to be accessed can be determined based only on the measurement report of the neighbor cells, i.e. the unique destination base station can be determined. In the CA supporting scenarios, before performing cell handover, the terminal device may be connected to a plurality of cells at the same time and these cells correspond to a same source base station. After the cell handover is performed, the terminal device may be still connected to a plurality of cells at the same time. If the cells to be accessed are selected based on only the performances of the neighbor cells, there is a possibility that the selected cells may belong to different base stations. Some embodiments of the invention provide a policy or scheme of selecting the destination base station and the cells to be accessed by the source base station in the CA supporting scenario.

Figure 9:
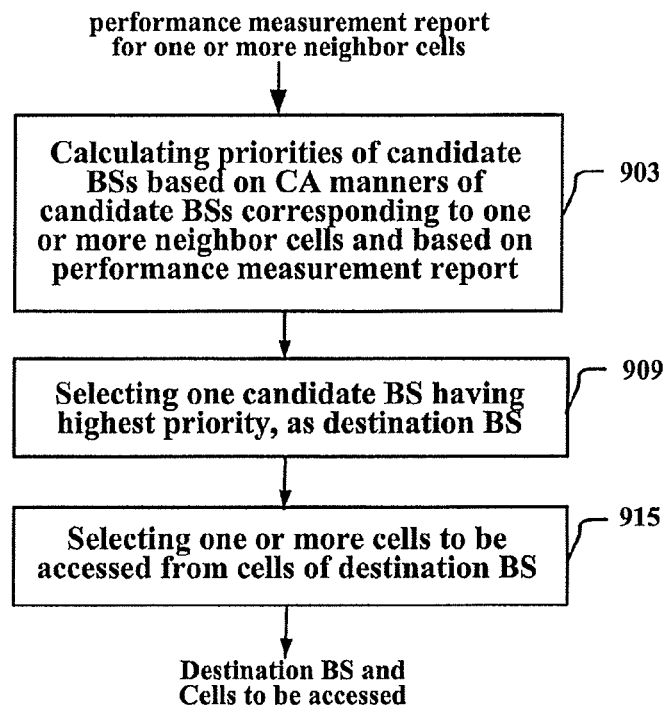
FIG. 9 is a schematic flow chart showing a method for cell handover performed by a source base station in a communication system according to an embodiment of the invention.

FIG. 9 shows an embodiment which illustrates a method of selecting a destination base station and cells to be accessed by a base station (referred to as the source base station) in the communication system supporting carrier aggregation according to the performance measurement report of the neighbor cells of a terminal device served by the base station transmitted by the terminal device.

As shown in FIG. 9, the method includes steps 903, 908 and 915. In step 903, the source base station receives the performance measurement report of the neighbor cells of a terminal device served by the base station transmitted by the terminal device. The performance measurement report may include the measurement results of one or more neighbor cells obtained by the terminal device. These neighbor cells may correspond to one or more candidate base stations. The source base station may select different algorithms based on the different carrier aggregation manners of the different candidate base stations, to calculate the priorities of these candidate base stations. Then in step 909, the source base station select one having the highest priority from these candidate base stations based on the calculated priorities, as the destination base station. In step 915, the source base station selects one or more from all the cells belonging to the destination base station in the one or more neighbor cells, as the cells to be accessed of the terminal device.

Since the candidate base stations may support different carrier aggregation manners, the neighbor cells thereof may present different characteristics. In the embodiment shown in FIG. 9, the source base station adaptively selects the algorithm of calculating the priorities based on the carrier aggregation manners of these neighbor cells. In this way the selection of the destination base station may be more adapted to the actual communication scenario. In addition, in the method the destination base station is determined first and the cells to be accessed are then selected from the cells of the destination base station. In this way, the case that the selected cells to be accessed belong to different base stations can be avoided.

Figure 10:
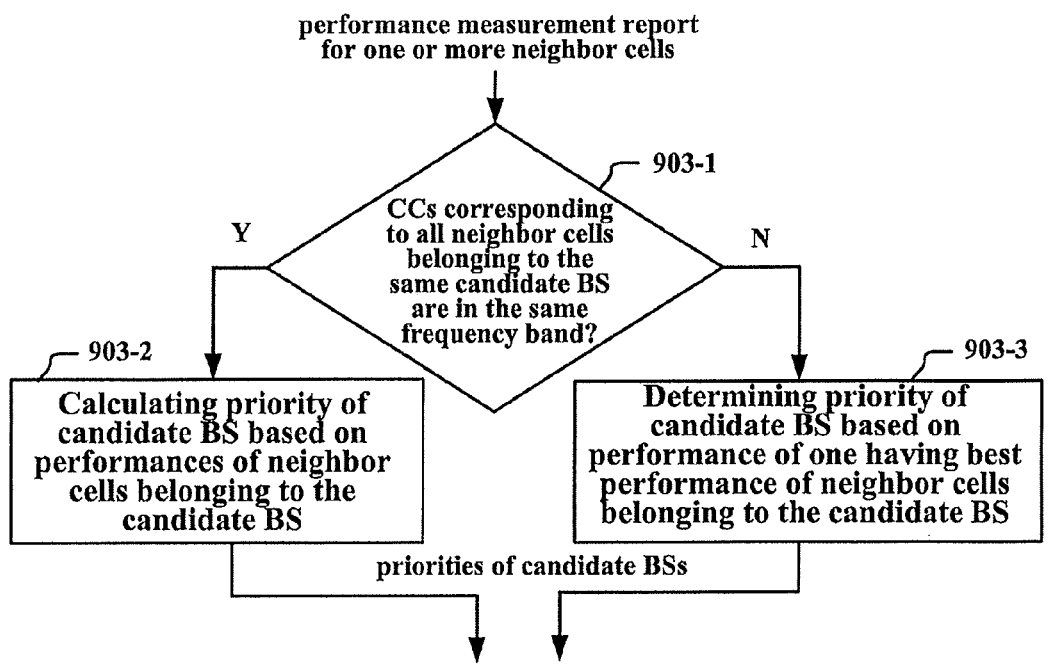
FIG. 10 is a schematic flow chart showing a method of calculating by a source base station the priority of a candidate base station based on the performance measurement report sent from the terminal device according to an embodiment of the invention.

FIG. 10 shows a particular embodiment of selecting different priority calculating algorithms according to the carrier aggregation scenarios of the candidate base stations.

As shown in FIG. 10, the method of selecting different priority calculating algorithms according to the carrier aggregation scenarios (e.g. step 903) may include steps 903-1, 903-2 and 903-3. In step 903-1, the source base station firstly judges whether the component carriers corresponding to the neighbor cells belonging to the same candidate base station among the one or more neighbor cells related to the performance measurement report are located in the same frequency bands. As described above, these neighbor cells may correspond to one or more candidate base stations.

If more than one neighbor cell corresponds to the same candidate base station and these neighbor cells are provided in the same frequency band, in step 903-2 the source base station calculates the priority of the candidate base station based on the performances of all the neighbor cells belonging to the candidate base station (If only one neighbor cell corresponds to a candidate base station, the priority of the candidate base station may be determined based on the performance of this neighbor cell). As an example, the source base station may calculate the sum of the performances of all the neighbor cells belonging to the candidate base station based on the measurement results in the performance measurement report, or may weight the performances of all the neighbor cells belonging to the candidate base station and then calculate the sum of the weighted performances. Then the source base station may determine the priority of the candidate base station based on the value of the calculated sum. The larger the sum is, the higher the priority is. It shall be noted that the weights may be determined according to the functions of the neighbor cells and the actual application scenario, the description of which is not detailed herein.

If more than one neighbor cell corresponds to the same candidate base station and these neighbor cells are provided in different frequency bands, in step 903-3 the source base station determines the priority of the candidate base station based on the performance of one neighbor cell having the best performance among all the neighbor cells belonging to the candidate base station in the performance measurement report. The higher the performance of the neighbor cell having the best performance is, the higher the priority of the candidate base station is.

In the embodiment of FIG. 10, different methods of calculating priorities are selected based on whether or not the consecutive CA scenario or non-consecutive CA scenario is involved, to obtain the priorities of the candidate base stations.

Figure 11:
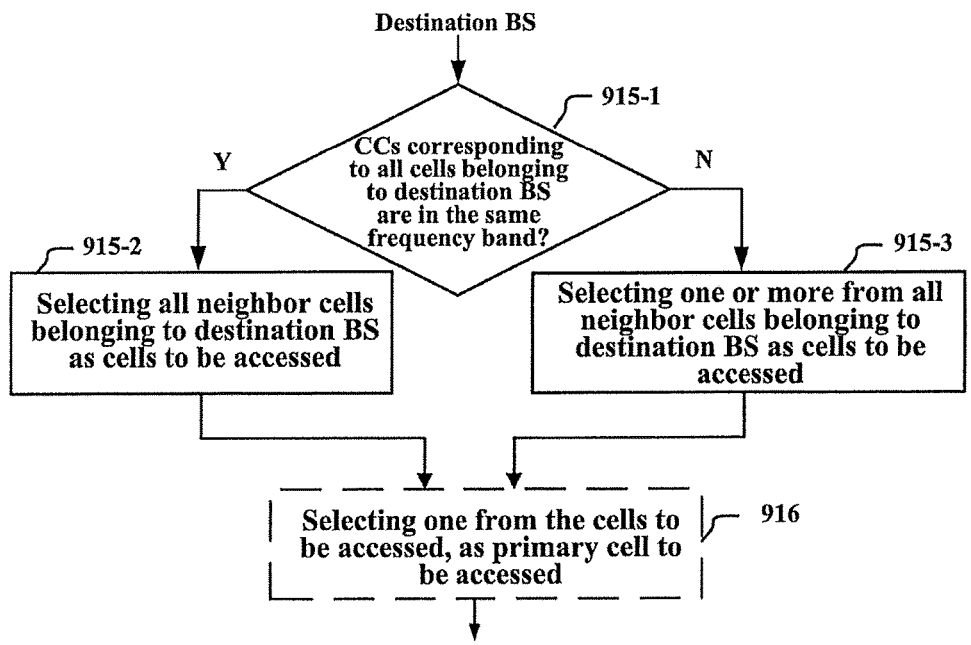
FIG. 11 is a schematic flow chart showing a method of selecting by a source base station a cell to be accessed based on the CA manners of a destination base station according to an embodiment of the invention.
Figure 12:
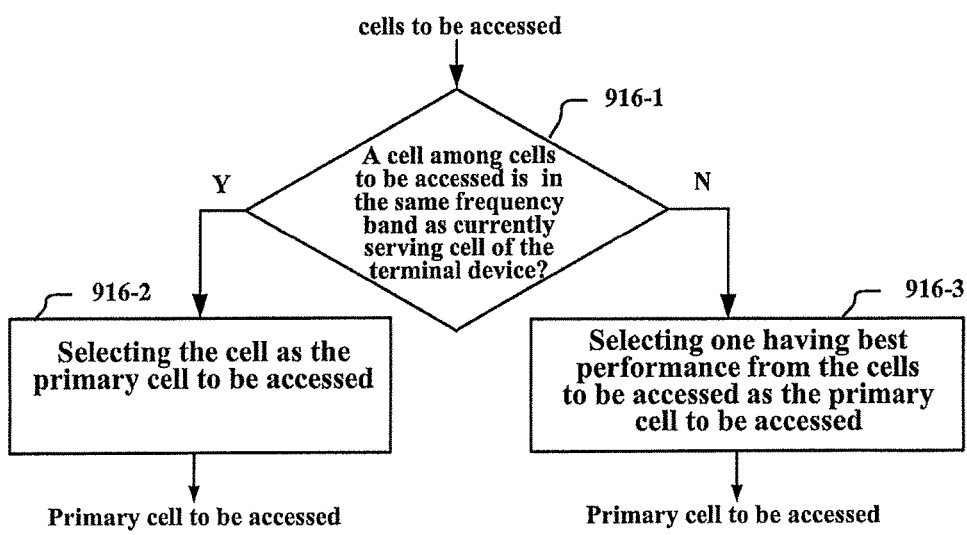
FIG. 12 is a schematic flow chart showing a method of selecting by a source base station a primary cell to be accessed based on the CA manners of a destination base station according to an embodiment of the invention.

In CA supporting scenario, the selected destination base station may support CA. Thus, the terminal device, after being handed over to the destination base station, may be connected to a plurality of cells. As an example, all the cells of the destination base station may be selected as the cells to be accessed for the terminal device. As another example, all the neighbor cells belonging to the destination base station in the one or more neighbor cells may be selected as the cells to be accessed for the terminal device, or one or more may be selected from all the neighbor cells belonging to the destination base station in the one or more neighbor cells, as the cells to be accessed for the terminal device. FIGS. 11-12 each shows another particular example of selecting the cells to be accessed by using different manners based on the different CA supporting scenarios.

As shown in FIG. 11, the method of selecting the cells to be accessed from the cells of the destination base station (e.g. step 915) may include steps 915-1, 915-2 and 915-3. In step 915-1 the source base station determines whether or not the component carriers corresponding to all the cells belonging to the destination base station among one or more neighbor cells involved in the performance measurement report are provided in the same frequency band, that is, determines whether the carrier aggregation manner of the destination base station is non-consecutive or not.

If determining that the component carriers corresponding to all the neighbor cells belonging to the destination base station are provided in the same frequency band, in step 915-2 the source base station selects one or more neighbor cells from all the neighbor cells belonging to the destination base station, as the cells to be accessed. If only one neighbor cell belongs to the destination base station, this neighbor cell is determined as the cell to be accessed.

If determining that the component carriers corresponding to all the neighbor cells belonging to the destination base station are provided in different frequency bands, in step 915-3 the source base station selects one or more neighbor cells from all the neighbor cells belonging to the destination base station, as the cells to be accessed. For example, the source base station the source base station may select one or more neighbor cells provided in the same frequency band from all the neighbor cells belonging to the destination base station, as the cells to be accessed; or, the source base station may select one or more neighbor cells provided in different frequency bands based on the practical requirements, as the cells to be accessed.

As an example, after selecting one or more cells to be accessed, e.g. after the step 915, the source base station may select one from the selected cells to be accessed as the primary cell to be accessed, as shown by the dotted line block 916 in FIG. 11. The primary cell to be accessed refers to the first cell to which the terminal device is connected to in the case that there is a plurality of cells to be accessed when performing cell handover. The terminal device may be connected to the primary cell firstly. After being connected to the primary cell, the terminal device may be connected to the other cells to be accessed by adding or actuating component carriers. For example, the component carriers corresponding to other cells to be accessed may be added by using RRC connection reconfiguration manner excluding mobile control message, so as to realize the CA transmission mode with a relatively small overhead.

FIG. 12 shows an example of selecting the primary cell to be accessed based on the CA scenarios. As shown in FIG. 12, the method of selecting one primary cell to be accessed from a plurality of cells to be accessed (e.g. step 916) includes steps 916-1, 916-2 and 916-3. In step 916-1, the source base station judges, among the selected one or more cells to be accessed determined by using the performance measurement report, whether there is a cell whose component carriers are in the same frequency band as the component carriers corresponding to the currently serving cell of the terminal device. If there is such a cell, in step 916-2 the cell is selected as the primary cell to be accessed. If there is not such a cell, in step 916-3 one having the best performance may be selected from all the cells to be accessed based on the performance measurement report, as the primary cell to be accessed.

In the example shown in FIG. 12, the cell whose frequency is the same with that of the currently serving cell of the terminal device is selected as the primary cell to be accessed as far as possible. In this way, the handover overhead resulted from the inconsistency between frequencies of the cell before handover and the cell after the handover may be reduced, thereby further reducing the interrupt time of the communication.

As an example, the other cells to be accessed may be connected to the terminal device by adding a carrier using RRC (Radio Source Control) connection reconfigure manner excluding mobile control information. In this way, the CA transmission may be realized with a relatively small overhead. It shall be noted that there are two types of RRC connection reconfigure manners. The first type is a reconfigure containing mobile control information, i.e. handover. The second type is a reconfigure excluding mobile control information. In the handover manner (i.e. the first type), MAC (Media Access Control) layer, PDCP (Packet Data Convergence Protocol) layer, and RLC (Radio Link Control) layer all need to be reconfigured, and the security key needs also to be reconfigured. This results in a large overhead. In contrast, the second type needs not to reconfigure the above functions, and thus brings about a relatively small overhead.

In another example, the source base station may select one having the best performance from all the neighbor cells belonging to the destination base station (or from the cells to be accessed selected by the source base station) based on the performance measurement report, as the primary cell to be accessed.

Figure 13:
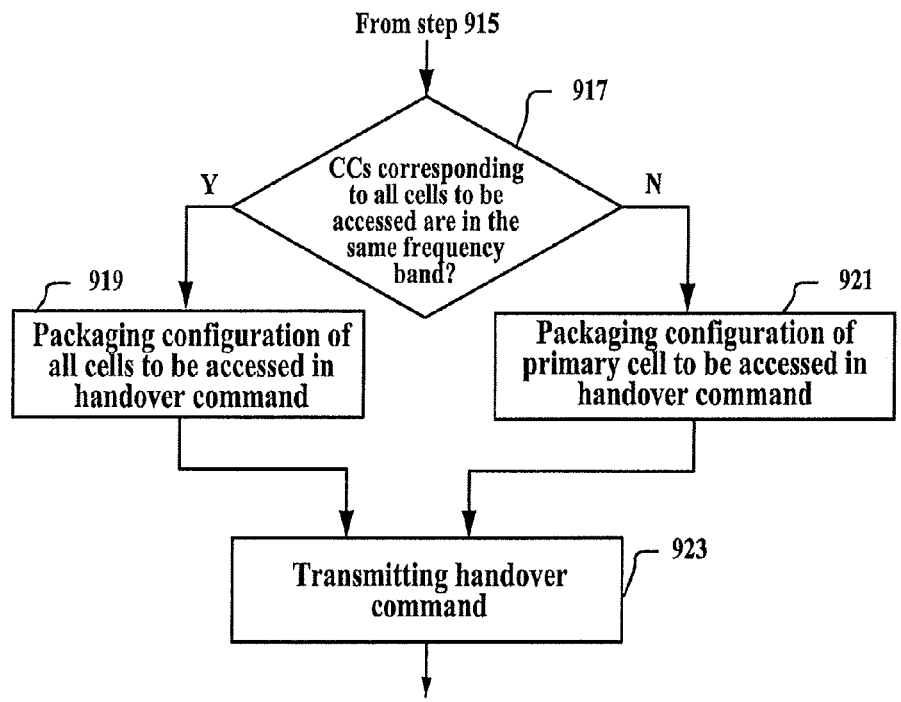
FIG. 13 is a schematic flow chart showing a method of forming by a source base station a handover command based on the CA manner of the selected cell to be accessed according to an embodiment of the invention.

FIG. 13 shows another method for cell handover according to another embodiment of the invention. As shown in FIG. 13, after determining the destination base station and the cells to be accessed (It shall be noted that the destination base station and the cells to be accessed can be determined by using the method in the above embodiments or examples), the process of the source base station forming a handover command and transmitting the handover command may include steps 917, 919, 921 and 923.

In step 917, the source base station judges whether the component carriers corresponding to the one or more selected cells to be accessed are provided in the same frequency band. If yes, in step 919 the source base station packages the configuration information of all the cells to be accessed in a handover command indicating initiation of cell handover of the terminal device. Otherwise, in step 921 the source base station packages the configuration information of only the primary cell to be accessed in the handover command. Finally in step 923, the source base station transmits the handover command to the destination base station.

In the method of FIG. 13, if the number of the selected cells to be accessed is larger than 1 and the component carriers corresponding to these cells to be accessed are provided in the same frequency band, the source base station packages the information of all the cells to be accessed in the handover command. Thus, the terminal device can be connected to all the cells to be accessed at a time. That is, after being handed over, the terminal device can enter the CA mode directly. If the terminal device uses CA communication mode before being handed over, the quality of service for the user can be ensured since the differences between the qualities of service before and after the handover can be reduced. If the number of selected cells to be accessed is larger than 1 and the component carriers corresponding to these cells to be accessed are provided in different frequency bands, the terminal device can firstly be connected to the primary cell. After being connected to the primary cell, the terminal device may be connected to the other cells to be accessed by adding component carriers, for example, the component carriers corresponding to the other cells to be accessed can be added by using RRC connection reconfigure manner excluding mobile control information, thereby the CA transmission mode can be realized with a relatively small overhead. If the selected primary cell to be accessed corresponds to component carriers that are in the same frequency band as those in the serving cell of the terminal device before the handover, the overhead due to the inconsistency between frequencies before and after the handover can be further reduced, thereby the interrupt time of the communication can be further shortened.

As an example, if the terminal device is currently connected to a plurality of cells of the source base station, the terminal device may be kept in communication with one of the plurality of cells to which it is currently connected to before the handover is completed. In conventional single carrier communication system (such as LTE system), a hard handover method is generally employed for cell handover. That is, during the handover the terminal device will disconnect its communication with the old cell first before being connected to the new cell, which inevitably results in communication interruption; thereby the quality of service for the user may be decreased. In the example, the disadvantages of CA communication are used, that is, the terminal device may keep in communication with one or more old cells before being connected to the new cell. The communication with the old cells is disconnected after the terminal device is completely connected to the new cell. This can significantly reduce the interruption time of communication, and can improve the quality of service experienced by the user.

Figure 15:
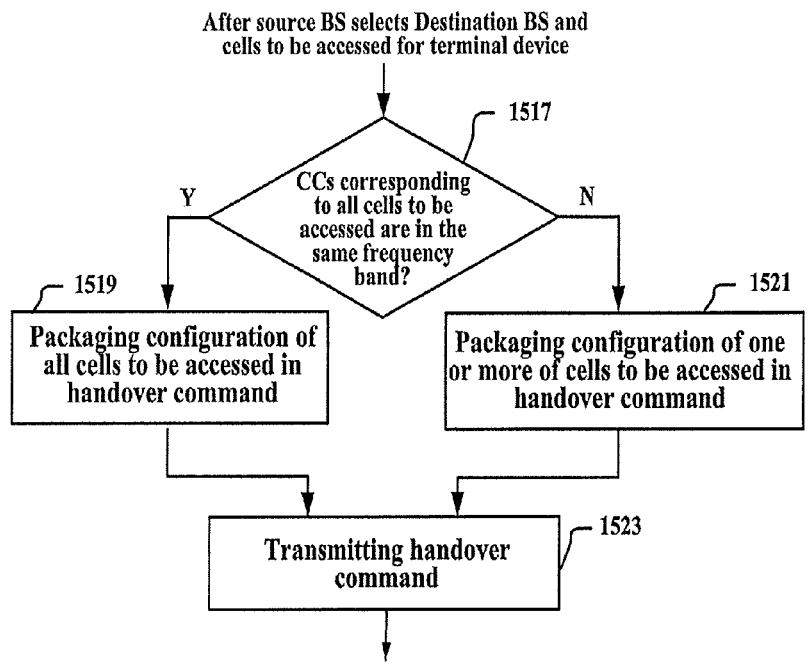
FIG. 15 is a schematic flow chart showing a method of cell handover performed by a source base station in a communication system according to an embodiment of the invention.

FIG. 15 shows a method for cell handover in a communication system supporting carrier aggregation according to another embodiment of the invention. The method is performed by the source base station in the communication system.

As shown in FIG. 15, the method may include steps 1517, 1519, 1521 and 1523. In step 1517, after selecting a destination base station and one or more cells to be accessed for a terminal device which is served by the source base station and is to be handed over, the source base station determines whether the component carriers corresponding to the selected cells to be accessed are provided in the same frequency band. If yes, in step 1519 the source base station packages the configuration information of all the cells to be accessed in a handover command indicating to initiate the handover for the terminal device. Otherwise, in step 1521 the source base station packages the configuration information of only part (one or several cells) of the cells to be accessed in the handover command. Finally in step 1523, the handover command is transmitted. By using this method, in the case that the cells to be accessed are of consecutive CA mode, the terminal device can be connected to all the cells to be accessed at a time, that is, the terminal device can enter CA mode directly after the handover. In the case that the terminal device is in CA communication mode before the handover, the quality of service for the user can be ensured since the differences in qualities of service before and after the handover can be reduced.

Figure 20:
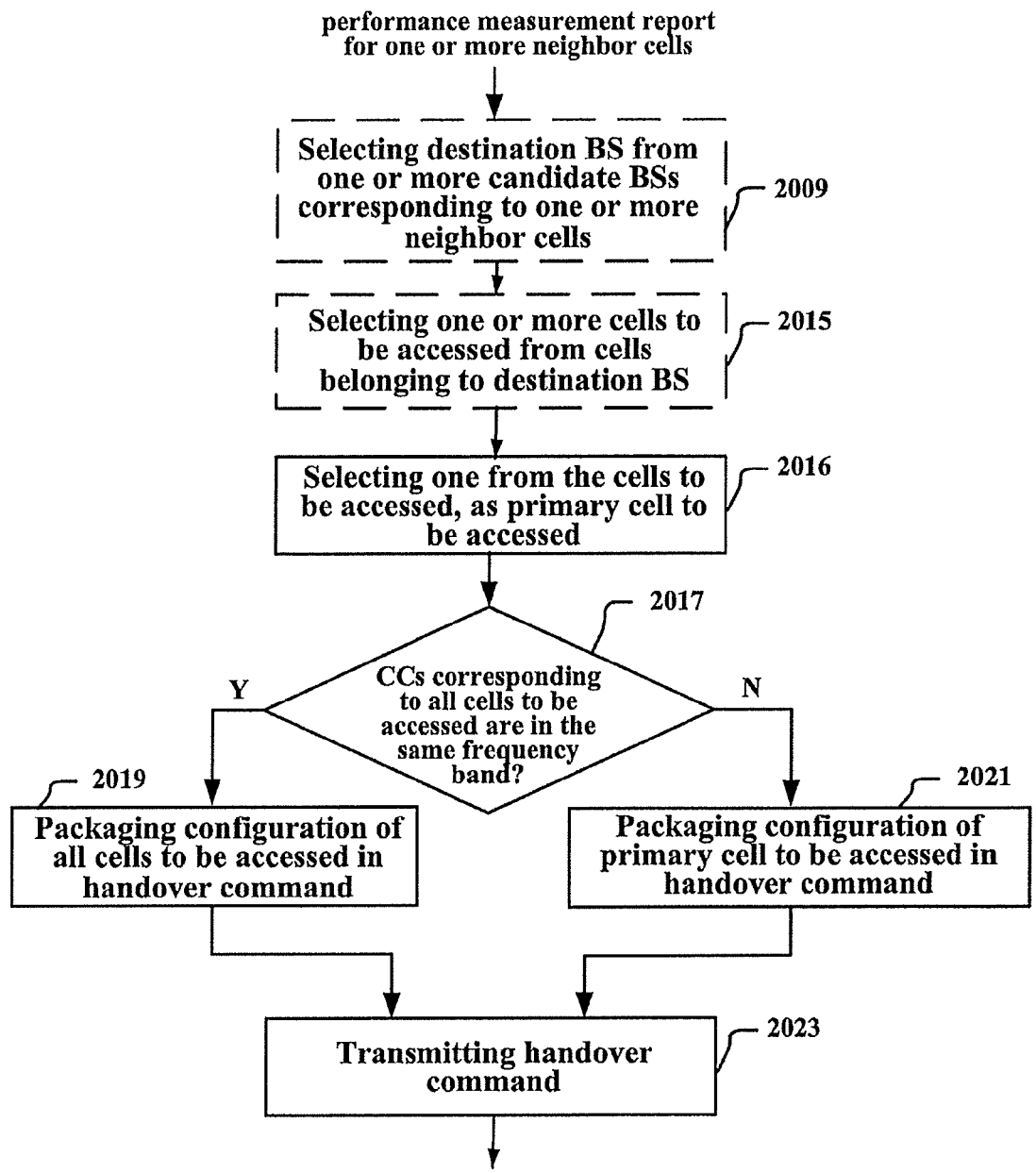
FIG. 20 is a schematic block diagram showing the structure of an apparatus for cell handover configured in a base station of a communication system supporting CA according to another embodiment of the invention.

FIG. 20 shows a method for cell handover in a communication system supporting carrier aggregation according to another embodiment of the invention. The method is similar to that in FIG. 15; the difference lies in that the method of FIG. 20 may further include a step 2016 of selecting a primary cell to be accessed.

As shown in FIG. 20, the method may include steps 2016, 2017, 2019, 2021 and 2023. Steps 2017, 2019, 2021 and 2023 are respectively similar to steps 1517, 1519, 1521 and 1523 shown in FIG. 15, the description of which is omitted herein. In step 2016, the source base station may select one from the one or more selected cells to be accessed, as the primary cell to be accessed. In the example, the source base station may package the configuration information of only the primary cell to be accessed in the handover command in step 2021. It shall be noted that the primary cell to be accessed can be selected by using the method shown in the above embodiments or examples, the description of which is not repeated.

As an example, the method shown in FIG. 15 or 20 may further include steps of selecting by the source base station the destination base station and the cells to be accessed, such as steps 2009 and 2015 shown in FIG. 20. For example, in steps 2009 and 2015, the source base station selects a destination base station from the candidate base stations corresponding to the neighbor cells of the terminal device and then selects one or more cells to be accessed from the cells of the destination base station, based on the performance measurement report transmitted from the terminal device. It shall be noted that the source base station may select the destination base station and the cells to be accessed by using any appropriate method, such as the method in the embodiments or examples described above with reference to FIGS. 9-13, the description of which is not repeated.

Figure 14:
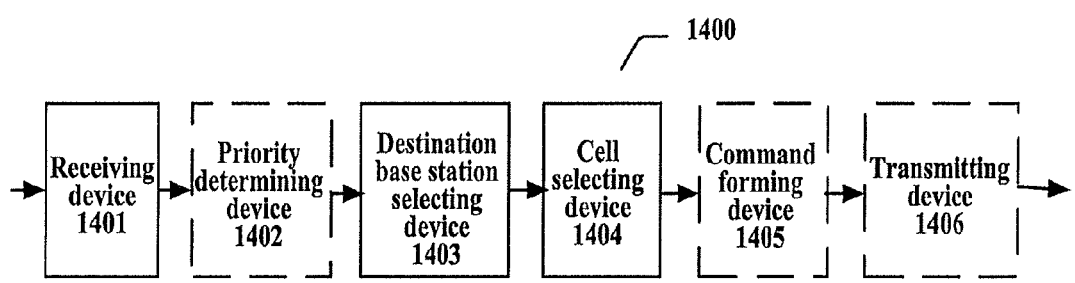
FIG. 14 is a schematic block diagram showing the structure of an apparatus for cell handover configured in a base station of a communication system supporting CA according to an embodiment of the invention.
Figure 16:
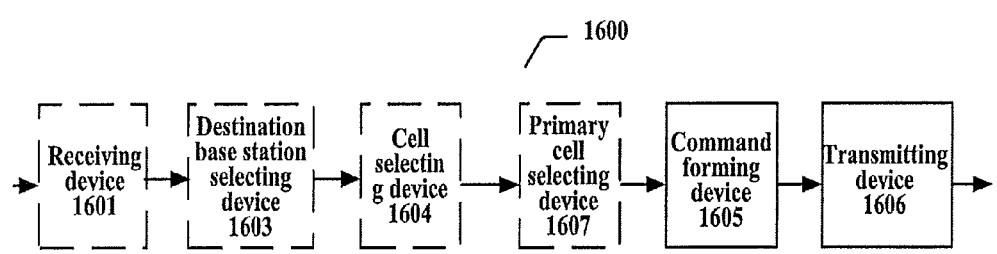
FIG. 16 is a schematic block diagram showing the structure of an apparatus for cell handover configured in a base station of a communication system supporting CA according to an embodiment of the invention.

FIG. 14 and FIG. 16 each show an embodiment or example of an apparatus for cell handover in the CA supporting scenario. The apparatus shown in FIG. 14 or 16 is configured in the base station of the communication system supporting carrier aggregation. The devices represented by dotted line blocks in the Figures are optional.

In the embodiment of FIG. 14, the apparatus for cell handover 1400 may include a receiving device 1401, a priority determining device 1402, a destination base station selecting device 1403 and a cell selecting device 1404. The receiving device 1400 is configured to receive the performance measurement report of one or more neighbor cells transmitted from a terminal device served by the base station. The priority determining device 1402 is configure to select different algorithms for calculating the priorities of the candidate base stations based on the performance measurement report and based on the carrier aggregation manners of one or more candidate base stations corresponding to the one or more neighbor cells. The destination base station selecting device 1403 may select one corresponding to the highest priority among the candidate base stations based on the priorities thereof calculated by the priority determining device 1402, as the destination base station. The cell selecting device 1404 selects one or more cells to be accessed for the terminal device from the cells belonging to the destination base station.

Since the candidate base stations may support different carrier aggregation manners, the neighbor cells thereof may present different characteristics. In the above example, the apparatus in the source base station adaptively selects different algorithms for calculating the priorities based on the carrier aggregation manners of these neighbor cells. In this way, the selection of the destination base station can be more adapted to the actual communication scenario. In addition, the apparatus determines the destination base station first, and then selects the cells to be accessed from the cells of the destination base station, which avoids the case that the selected cells to be accessed belong to different base stations.

As a particular example of the embodiment, the priority determining device 1402 may firstly judge whether the candidate base station is of consecutive CA mode or non-consecutive CA mode and select an algorithm adapted to the consecutive or non-consecutive CA mode. Particularly, the priority determining device 1402 may judge whether the component carriers corresponding to the neighbor cells belonging to the same candidate base station among the one or more neighbor cells are provided in the same frequency band.

If more than one neighbor cell corresponds to the same candidate base station and these neighbor cells are provided in the same frequency band, the priority determining device 1402 may calculate the priority of the candidate base station according to the performances of all the neighbor cells belonging to the candidate base station (if only one neighbor cell corresponds to a candidate base station, the priority of the candidate base station may be determined base on the performance of the neighbor cell). As an example, the sum of the performances of the entire neighbor cells belonging to the candidate base station may be calculated based on the measurement results in the performance measurement report, or the performances of all the neighbor cells belonging to the candidate base station may be weighted and then the sum of the weighted performances may be calculated. Then the priority of the candidate base station may be determined based on the value of the calculated sum. The larger the sum is, the higher the priority is. It shall be noted that the weights may be determined according to the functions of the neighbor cells and the actual application scenario, the description of which is not repeated.

If more than one neighbor cell corresponds to the same candidate base station and these neighbor cells are provided in different frequency bands, the priority determining device 1402 may determine the priority of the candidate base station based on the performance of one neighbor cell having the best performance among all the neighbor cells belonging to the candidate base station in the performance measurement report. The higher the performance of the neighbor cell having the best performance is, the higher the priority of the candidate base station is.

As a particular example, the cell selecting device 1404 may further select one or more from all the neighbor cells belonging to the destination base station among the one or more neighbor cells involved in the performance measurement report, as the cells to be accessed. For example, the cell selecting device 1404 may use all the neighbor cells belonging to the destination base station among the one or more neighbor cells involved in the performance measurement report, as the cells to be accessed. As another example, the cell selecting device 1404 may select one or more from all the cells belonging to the destination base station, as the cells to be accessed. As examples, the cell selecting device 1404 may select the cells to be accessed by using different manners based on the different CA supporting scenarios, with the method described above with reference to FIGS. 11-12, which makes the selected cells to be accessed more suitable to the actual CA supporting scenario.

For example, the cell selecting device 1404 may firstly determine whether the component carriers corresponding to all the neighbor cells belonging to the destination base station among one or more neighbor cells involved in the performance measurement report are in the same frequency band. If yes, the cell selecting device 1404 may select all the neighbor cells belonging to the destination base station as the cells to be accessed; otherwise, select one or more from the neighbor cells belonging to the destination base station, as the cells to be accessed. If only one neighbor cell belongs to the destination base station, the neighbor cell is used as the cell to be accessed.

As an example, the cell selecting device 1404 may further select one from the selected cells to be accessed as the primary cell to be accessed. For example, the cell selecting device 1404 may judge, among the selected one or more cells to be accessed, whether there is a cell whose component carriers are in the same frequency band as the component carriers corresponding to the currently serving cell of the terminal device; and if there is such a cell, select the cell as the primary cell to be accessed, otherwise, select one having the best performance from all the neighbor cells belonging to the destination base station based on the performance measurement report, as the primary cell to be accessed. For another example, after the destination base station selecting device 1403 selects the destination base station, the cell selecting device 1404 may further select one having the best performance from all the neighbor cells belonging to the destination base station, as the primary cell to be accessed. The cell selecting device 1404 may select the primary cell to be accessed by using the above method in the above embodiments or examples, the description of which is not repeated.

In another example, the apparatus 1400 may further include a demand forming device 1405 and a transmitting device 1406. The demand forming device 1405 may form the handover command by using the method shown in FIG. 13. Particularly, the demand forming device 1405 may determine whether the component carriers corresponding to the selected cells to be accessed are provided in the same frequency band, if yes, package the configuration information of all the cells to be accessed in the handover command; otherwise, package the configuration information of only the primary cell to be accessed in the handover command. The transmitting device 1406 is configured to transmit the handover command to the destination base station. In the example, if the number of the selected cells to be accessed is larger than 1 and the component carriers corresponding to these cells to be accessed are provided in the same frequency band, the terminal device can be connected to all the cells to be accessed at a time. That is, after being handed over, the terminal device can enter the CA mode directly. If the terminal device uses CA communication mode before being handed over, the quality of service for the user can be ensured since the differences between the qualities of service before and after the handover can be reduced. In addition, if the number of selected cells to be accessed is larger than 1 and the component carriers corresponding to these cells to be accessed are provided in different frequency bands, the terminal device can firstly be connected to the primary cell. After being connected to the primary cell, the terminal device may be connected to the other cells to be accessed by adding component carriers, for example, the component carriers corresponding to the other cells to be accessed can be added by using RRC connection reconfigure manner excluding mobile control information, thereby the CA transmission mode can be realized with a relatively small overhead.

As an example, if the terminal device to be handed over is currently connected to a plurality of cells of the source base station, the terminal device may be kept in communication with one of the plurality of cells to which it is currently connected to before the handover is completed. For example, the source base station (e.g. the transmitting device 1406) may send a command to the terminal device to instruct the terminal device to keep in communication with an old cell. Similar to the above embodiments or examples, this can significantly reduce the interruption time of communication, and can improve the quality of service experienced by the user.

In the embodiment of FIG. 16, the apparatus 1600 may perform the method of FIG. 15. Particularly, the apparatus 1600 may include a demand forming device 1605 and a transmitting device 1606.

The demand forming device 1605 is configured to determine whether the component carriers corresponding to the selected cells to be accessed belonging to the destination base station selected by the present base station for the terminal device served by the present base station and to be handed over are provided in the same frequency band. If yes, the demand forming device 1605 packages the configuration information of all the cells to be accessed in a handover command indicating to initiate the handover for the terminal device. Otherwise, the demand forming device 1605 packages the configuration information of only part (one or several cells) of the cells to be accessed in the handover command. The transmitting device 1606 transmits the handover command to the destination base station. By using this apparatus, in the case that the cells to be accessed are of consecutive CA mode, the terminal device can be connected to all the cells to be accessed at a time, that is, the terminal device can enter CA mode directly after the handover. In the case that the terminal device is in CA communication mode before the handover, the quality of service for the user can be ensured since the differences in qualities of service before and after the handover can be reduced.

As an example, the apparatus 1600 for cell handover may include a primary cell selecting device 1607, configured to select one from one or more selected cells to be accessed, as the primary cell to be accessed. Thus, the demand forming device may package only the configuration information of the primary cell in the handover command. In such a case, the terminal device may firstly be connected to the primary cell. After that, the terminal device may be connected to the other cells to be accessed by adding or actuating component carriers. For example, the component carriers corresponding to the other cells to be accessed may be added by RRC connection reconfigure mode excluding the mobile control information, thereby the CA transmission mode can be realized with a relative small overhead.

Particularly, the primary cell selecting device 1607 may select one having the best performance among the selected cells to be accessed based on the performance measurement report, as the primary cell to be accessed.

Alternatively, the primary cell selecting device 1607 may select the primary cell to be accessed, based on the carriers of the selected cells to be accessed. Particularly, the primary cell selecting device 1607 may judge whether there is a cell, among the selected cells to be accessed, whose corresponding component carriers are in the same frequency band as the component carriers corresponding to the currently serving cell of the terminal device, if yes, select this cell as the primary cell to be accessed, otherwise, select one having the best performance among all the neighbor cells belong to the destination base station, as the primary cell to be accessed. IF the primary cell to be accessed is provided in the same frequency band as the currently serving cell of the terminal device, the handover overhead due to the inconsistency between the frequencies before and after the handover can be reduced, thereby the interrupt time of communication can be further reduced.

As an example, the apparatus 1600 for cell handover may further include a receiving device 1601, a destination base station selecting device 1603 and a cell selecting device 1604. Similar to the above embodiments or examples, the receiving device 1601 is configured to receive the performance measurement report of one or more neighbor cells transmitted from the terminal device served by the base station. The destination base station selecting device 1603 is configure to select one from one or more candidate base stations corresponding to the one or more neighbor cells, based on the performance measurement report, as the destination base station. The destination base station selecting device 1603 may select the destination base station by using the method shown in the above embodiments or examples or any other appropriate method. For example, the destination base station selecting device 1603 may be similar to the device 1403 in FIG. 14, the description of which is not repeated. The cell selecting device 1604 is configured to select one or more cells to be accessed for the terminal device from all the neighbor cells belonging to the destination base station.

As a particular example, the cell selecting device 1604 may select the cells to be accessed by using the method shown in the above embodiments or examples. For example, the cell selecting device 1604 may determine whether the component carriers corresponding to all the neighbor cells belonging to the destination base station are provided in the same frequency band, if yes, select all the neighbor cells belonging to the destination base station as the cells to be accessed, otherwise, select one or more from all the neighbor cells belonging to the destination base station, as the cells to be accessed.

In another particular example, the apparatus 1600 may further include the priority determining device 1402 as described above with reference to FIG. 14, the function of which is similar to that described above and the description of which is not repeated.

Some embodiments of the invention provide methods of cell handover under CA supporting scenarios. These methods may include the flows of cell handover performed by the terminal device and the source base station in the above and below embodiments or examples, the description of which is not repeated.

Some embodiments of the invention provide a communication system including the terminal device and/or the base station described in the above and below embodiments or examples.

Figure 17:
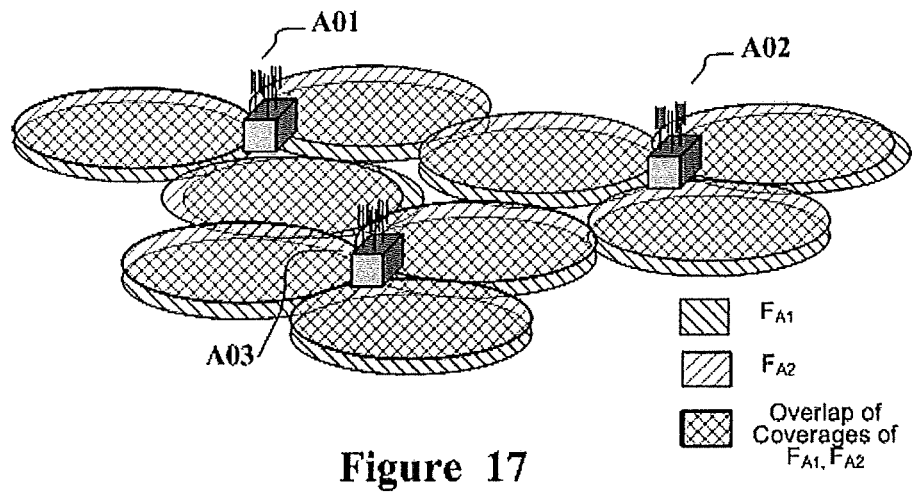
FIG. 17, FIG. 18, and FIG. 19 each show an application scenario to which the methods of cell handover according to the above embodiments can be applied.
Figure 18:
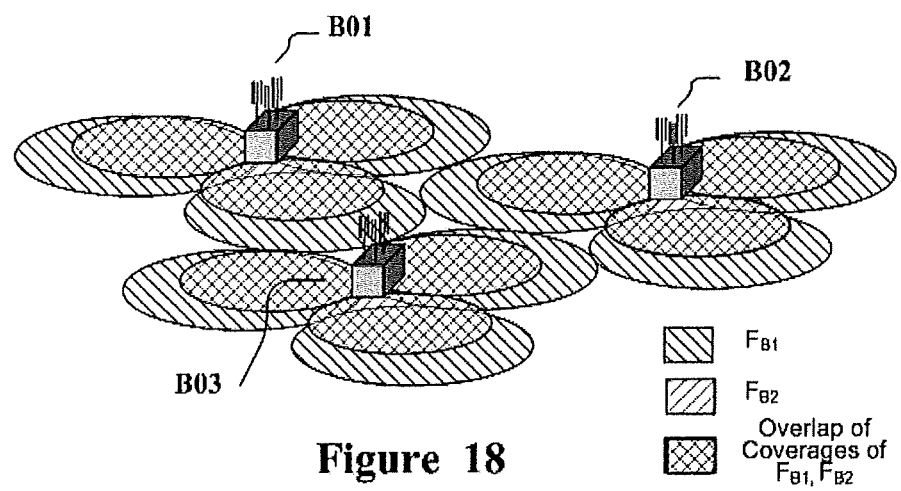
Figure 19:
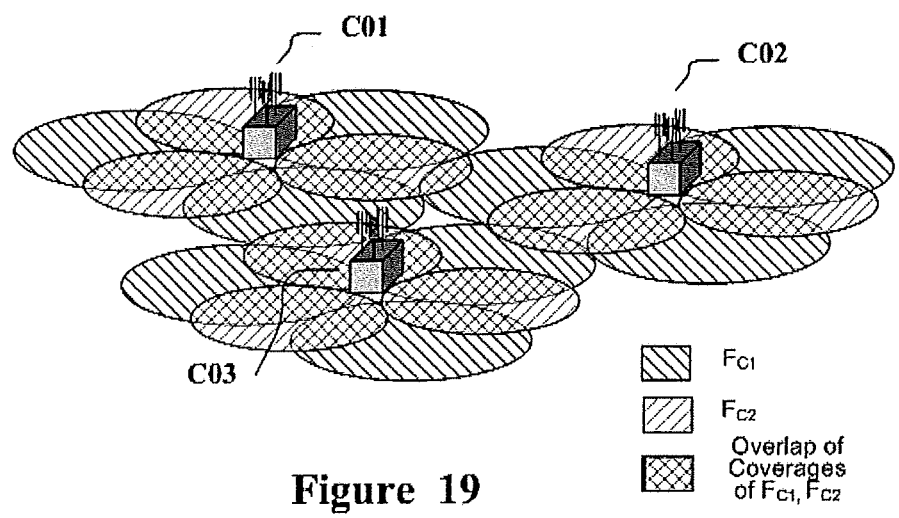

FIG. 17, FIG. 18, and FIG. 19 each show an application scenario to which the above methods of cell handover may be applied. In the figures, A01-A03, B01-B03, and C01-A03 respectively represent base stations. In FIG. 17, the coverages of the cells corresponding to the component carriers $F_{A1}$ and $F_{A2}$ are substantially overlapped with each other, and can provide similar coverages. $F_{A1}$ and $F_{A2}$ are in the same frequency bands, which belongs to the typical consecutive carrier aggregation manner. FIG. 18 and FIG. 19 respectively correspond to non-consecutive CA scenarios, in which the component carriers $F_{B1}$ and $F_{B2}$ are in different frequency bands, and $F_{C1}$ and $F_{C2}$ also are in different frequency bands. The cell corresponding to $F_{B1}$ or $F_{C1}$ is mainly used to ensure coverage and the cell corresponding to $F_{B2}$ or $F_{C2}$ is mainly used to improve throughput. The difference between FIG. 18 and FIG. 19 lies in that, in FIG. 19 the antenna of the cell corresponding to $F_{C2}$ is directed to the edge region of the cell corresponding to $F_{C1}$, such that the application scenario in FIG. 19 can significantly improve the throughput at the edge region of the cell corresponding to $F_{C1}$.

According to some examples, the process of cell handover may include a preparation stage, a performing stage and a finishing stage. Different scenarios correspond to different handover policies. The processes of cell handover in the 3 typical application scenarios are described below Scenario Shown in FIG. 17:

Preparation Stage:

When the terminal device is at the edge of the coverage of the currently serving cell, it needs to measure all the neighbor cells. A carrier frequency corresponds to a neighbor cell, if the neighbor cells belonging to the same base station are in the same frequency band; only one neighbor cell is selected and measured. At this time, it is supposed that the measurement result obtained by the terminal device for the cell corresponding to $F_{A1}$ is denoted as $M_{f1}$, the measurement result for the cell corresponding to $F_{A2}$ is denoted as $M_{f2}$, and the measurement result for a neighbor cell is denoted as $M_f$. If one of the following conditions is met, the terminal device transmits the measurement result to the base station.

$$M_f \geq Th_1 \text{ Or}$$

$$M_f \geq M_{f1} + Th_2 \text{ Or } M_f \geq M_{f2} + Th_2$$

That is, if the measurement result of the neighbor cell is higher than a threshold ($Th_1$) or is better than the measurement result of a cell to which the terminal device is connected to, the terminal device transmits the measurement result to the base station. That is, the neighbor cell can be used as a candidate destination cell.

In actual processing, the base station or the terminal device may randomly specify one of the cells to which the terminal device is connected, as the object to be compared with the measurement result of the neighbor cell.

Performing Stage:

In this stage the destination base station and the cells to be accessed are determined. Since the carrier frequencies of candidate cells belonging to the same base station are in the same frequency band, the priority of the base station can be decided by the weighted performances of these candidate cells. The base station having the highest priority is selected as the destination base station. Since the carrier frequencies of candidate cells belonging to the destination base station are in the same frequency band, all the candidate cells are used as the cells to be accessed. Here, it is supposed that the cells corresponding to $F_{A1}$ and $F_{A2}$ in the base station A02 are selected as the cells to be accessed.

Finishing Stage:

The terminal device connects to a plurality of cells before handover, the number of the selected cells to be accessed is more than one and the component carriers corresponding to these cells to be accessed are in the same frequency band. When sending a handover request, the source base station sends the information of all the cells to be accessed to the destination base station.

The destination base station performs an access control estimation based on the received information, and if it allows the terminal device to access, it sends an ACK message to the source base station.

After receiving the ACK message, the source base station transmits an RRC connection reconfigure message containing the mobility control information, to initiate the RRC connection reconfigure for all the cells to be accessed.

When the reconfigure is completed, the terminal device chooses to disconnect from the one or more original cells, and keeps in communication with at least one original cell, and sends a synchronization request to all the cells to be accessed to the destination base station, so as to be synchronized to the new cells.

When the terminal device is synchronized with all the cells to be accessed in the destination base station and completes the corresponding accessing processes so that it is ready for data transmission, the terminal device disconnects from the original cell and is completely served by the new base station and cells.

Scenario Shown in FIG. 18:

Preparation Stage:

when the terminal device is at the edge of a cell, it needs to measure all the neighbor cells, one of which corresponds to a carrier frequency. At this time, it is supposed that the measurement result of the terminal device for the cell corresponding to $F_{B1}$ is denoted as $M_{f1}$, the measurement result for the cell corresponding to $F_{B2}$ is denoted as $M_{f2}$, and the measurement result for a neighbor cell is denoted as $M_f$.

If one of the following conditions is met, the terminal device transmits the measurement result of the neighbor cell to the base station:

$$M_f \geq Th_1, \text{ or}$$

$$M_f \geq M_{f1} + Th_2 \text{ Or } M_f \geq M_{f2} + Th_2$$

That is, if the measurement result of the neighbor cell is higher than a threshold ($Th_1$) or is better than the measurement result of any cell to which the terminal device is connected to, the terminal device transmits the measurement result of the neighbor cell to the base station. That is, the neighbor cell is selected as a candidate cell for handover.

In actual processing, the base station or the terminal device may randomly specify one of the cells to which the terminal device is connected, as the object to be compared with the measurement result of the neighbor cell.

Performing Stage:

In this stage the destination base station and the cells to be accessed are determined. The priority of the candidate base station can be decided depending upon whether or not the carrier frequencies of candidate cells belonging to the same base station are in the same frequency band. The base station having the highest priority is selected as the destination base station. The cells to be accessed are decided based on the number of candidate cells belonging to the destination base station, whether or not in the same frequency band, and the relationship with the carrier frequency before handover. Here it is supposed that the cells corresponding to $F_{B1}$ and $F_{B2}$ in the base station B03 are selected as the cells to be accessed.

Finishing Stage:

It is supposed that the terminal device is connected to only one cell before handover. The number of the cells to be accessed is more than one, and the component carriers corresponding to these cells to be accessed are in different frequency bands. It is also supposed that $F_{B1}$ refers to the frequency of the cell before the handover. At this time, the cell corresponding to $F_{B1}$ is selected as the primary cell to be accessed, and when sending the handover request, the source base station sends the information of the primary cell to the destination base station.

The destination base station performs access control estimation, and if it allows the terminal device to access, it sends an ACK message to the source base station.

After receiving the ACK message, the source base station transmits an RRC connection reconfigure message containing the mobility control information, to initiate the RRC connection reconfigure for the primary cell to be accessed.

When the reconfigure is completed, the terminal device chooses to disconnect from the original cell, and send a synchronization request to the primary cell to be accessed to the destination base station, so as to be synchronized to the new cells.

When the terminal device is synchronized with the primary cell to be accessed in the destination base station and completes the corresponding accessing processes, it is ready for data transmission. At this time, the terminal device is completely served by the new base station and cells.

The terminal device initiates an RRC connection reconfigure message excluding the mobility control information, to add the component carrier $F_{B2}$, and to access the cell corresponding to $F_{B2}$. In this way carrier aggregation is realized.

Scenario Shown in FIG. 19:

Preparation Stage:

When the terminal device is at the edge of a cell, it needs to measure all the neighbor cells, one of which corresponds to a carrier frequency. At this time, it is supposed that the measurement result of the terminal device for the cell corresponding to $F_{C1}$ is denoted as $M_{f1}$, the measurement result for the cell corresponding to $F_{C2}$ is denoted as $M_{f2}$, and the measurement result for a neighbor cell is denoted as $M_f$. If one of the following conditions is met, the terminal device transmits the measurement result of the neighbor cell to the base station:

$M \geq Th_1$, or $M_f \geq M_{f1} + Th_2$ And $M_f \geq M_{f2} + Th_2$

That is, if the measurement result of the neighbor cell is higher than a threshold ($Th_1$) or is better than the measurement results of all the cells to which the terminal device is connected to, the terminal device transmits the measurement result of the neighbor cell to the base station. That is, the neighbor cell is selected as a candidate cell for handover.

In actual processing, the base station or the terminal device selects one cell having the best measurement result, as the object to be compared with the measurement result of the neighbor cell.

Performing Stage:

In this stage the destination base station and the cells to be accessed are determined. Particularly, the priority of the candidate base station can be decided depending upon whether or not the carrier frequencies of candidate cells belonging to the same base station are in the same frequency band. The base station having the highest priority is selected as the destination base station. The cells to be accessed are decided based on the number of candidate cells belonging to the destination base station, whether or not in the same frequency band, and the relationship with the carrier frequency before handover. Here it is supposed that the cells corresponding to $F_{C1}$ and $F_{C2}$ in the base station C03 are selected as the cells to be accessed.

Finishing Stage:

It is supposed that the terminal device connects to a plurality of cells at the same time before handover, the number of the selected cells to be accessed is more than one and the component carriers corresponding to these cells to be accessed are in different frequency bands. When sending a handover request, the source base station sends the information of all the cells to be accessed to the destination base station.

The destination base station performs access control estimation, and if it allows the terminal device to access, it sends an ACK message to the source base station.

After receiving the ACK message, the source base station transmits an RRC connection reconfigure message containing the mobility control information, to initiate the RRC connection reconfigure for all the cells to be accessed.

When the reconfigure is completed, the terminal device chooses to disconnect from one or more original cells, and keeps in communication with at least one original cell, and sends a synchronization request to all the cells to be accessed to the destination base station, so as to be synchronized to the new cells.

When the terminal device is synchronized with all the cells to be accessed in the destination base station and completes the corresponding accessing processes so that it is ready for data transmission, the terminal device disconnects from the original cell and is completely served by the new base station and cells.

It should be understood that the above embodiments and examples are illustrative, rather than exhaustive. The present disclosure should not be regarded as being limited to any particular embodiments or examples stated above.

As an example, the components, units or steps in the above apparatuses and methods can be configured with software, hardware, firmware or any combination thereof in the base station or the terminal device in a communication network, as part of the base station or the terminal device, by using method or means well known in the art, the details of which are omitted herein. As an example, the above methods or apparatus can be realized in existing base station or terminal device in a communication system, with a modification to the related parts of the existing base station or terminal device.

Figure 21:
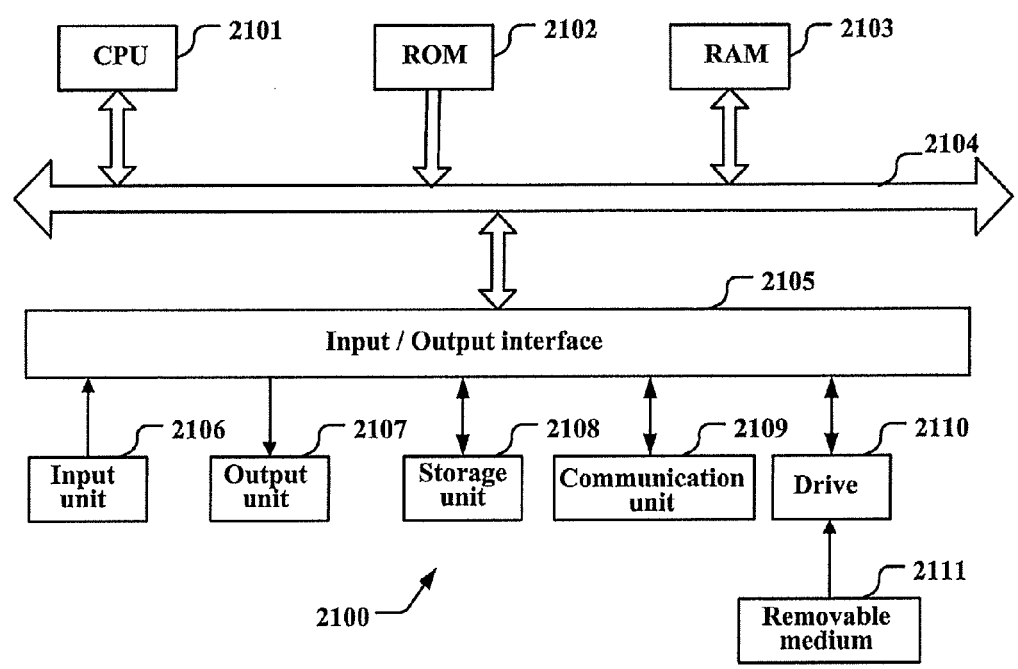
FIG. 21 is a schematic block diagram showing the structure of a computer with which the embodiments of the invention can be realized.

As an example, in the case of using software or firmware, programs constituting the software for realizing the above method or apparatus can be installed to a computer with a specialized hardware structure (e.g. the general purposed computer as shown in FIG. 21) from a storage medium or a network. The computer, when installed with various programs, provides circuitry capable of carrying out various functions.

In FIG. 21, a central processing unit (CPU) 2101 executes various types of processing in accordance with programs stored in a read-only memory (ROM) 2102, or programs loaded from a storage unit 2108 into a random access memory (RAM) 2103. The RAM 2103 also stores the data required for the CPU 2101 to execute various types of processing, as required. The CPU 2101, the ROM 2102, and the RAM 2103 are connected to one another through a bus 2104. The bus 2104 also connects to an input/output interface 2105.

The input/output interface 2105 connects to an input unit 2106 composed of a keyboard, a mouse, etc., an output unit 2107 composed of a cathode ray tube or a liquid crystal display, a speaker, etc., the storage unit 2108, which includes a hard disk, and a communication unit 2109 composed of a modem, a terminal adapter, etc. The communication unit 2109 performs communicating processing. A drive 2110 is connected to the input/output interface 2105, if needed. In the drive 2110, for example, removable media 2111 is loaded as a recording medium containing a program of the present invention. The program is read from the removable media 2111 and is installed into the storage unit 2108, as required.

In the case of using software to realize the above consecutive processing, the programs constituting the software may be installed from a network such as Internet or a storage medium such as the removable media 2111.

Those skilled in the art should understand the storage medium is not limited to the removable media 2111, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 2102 or the hard disc involved in the storage unit 2108, where the program is recorded and which are previously mounted on the main body of the device and delivered to the user.

The present disclosure further provides a program product having machine-readable instruction codes which, when being executed, may carry out the method for cross phase modulation recovery according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

What is claimed is:

1. An electronic device in a radio communication system, comprising
    circuitry, configured to
    acquire a measurement report of performances of measurement objects from a terminal device served by the electronic device; and
    determine, based on the measurement report, a handover scheme adaptive to a manner of radio resource aggregation supported by a target base station to serve the terminal device, the manner of radio resource aggregation being one of multiple manners of radio resource aggregation in the radio communication system, wherein
    the circuitry is configured to select the target base station from multiple candidate base stations according to a priority of each candidate base station which is determined adaptive to the manner of radio resource aggregation supported by each candidate base station.

2. The electronic device according to claim 1, wherein the circuitry is configured to calculate the priority based on an algorithm adaptive to the manner of radio resource aggregation supported by corresponding candidate base station, wherein different algorithms are corresponding to different manner of radio resource aggregation.

3. The electronic device according to claim 2, wherein the radio resource aggregation corresponds to aggregation of carriers, and in case that carriers belonging to a candidate base station are of different characteristics, the circuitry is configured to use a performance of a best carrier in the carriers according to the measurement report to determine the priority of the candidate base station, the better the performance of the best carrier, the higher priority of the candidate base station to be selected as the target base station.

4. The electronic device according to claim 2, wherein the radio resource aggregation corresponds to aggregation of carriers, and in case that carriers belonging to a candidate base station are of similar characteristics, the circuitry is configured to use a weighted sum of performances of the carriers according to the measurement report to determine the priority of the candidate base station, the better the weighted sum of performances, the higher priority of the candidate base station to be selected as the target base station.

5. The electronic device according to claim 1, wherein
    the radio resource aggregation corresponds to aggregation of carriers, and in case that carriers belonging to the target base station are of different characteristics, the circuitry is configured to packet configuration information of one or more carriers in the carriers in a handover command to the target base station.

6. The electronic device according to claim 1, wherein
    the radio resource aggregation corresponds to aggregation of carriers, and in case that carriers belonging to the target base station are of similar characteristics, the circuitry is configured to packet configuration information of all the carriers in a handover command to the target base station.

7. The electronic device according to claim 1, wherein
    the radio resource aggregation corresponds to aggregation of carriers, and the multiple manners of radio resource aggregation in the radio communication system comprises aggregation of carriers in same frequency band and aggregation of carriers in different frequency bands.

8. The electronic device according to claim 7, wherein the electronic device is implemented as a source base station of the terminal device and the electronic device further comprises
    a communication interface, configured to transmit a handover command adaptive to the manner of radio resource aggregation to the target base station, receive acknowledge message from the target base station, and transmit a radio resource control connection reconfiguration message comprising mobility control information to the terminal device to handover to the target base station.

9. An electronic device in a radio communication system, comprising
    circuitry, configured to
    generate a measurement report of performances of measurement objects for a base station serving the electronic device; and
    acquire a radio resource control connection reconfiguration message comprising mobility control information from the base station to handover to a target base station,
    wherein a handover scheme is determined, based on the measurement report, adaptive to a manner of radio resource aggregation supported by the target base station to serve the electronic device, the manner of radio resource aggregation being one of multiple manners of radio resource aggregation in the radio communication system, wherein
    the target base station is selected from multiple candidate base stations according to a priority of each candidate base station which is determined adaptive to the manner of radio resource aggregation supported by each candidate base station.

10. The electronic device according to claim 9, wherein the priority is calculated based on an algorithm adaptive to the manner of radio resource aggregation supported by corresponding candidate base station, wherein different algorithms are corresponding to different manner of radio resource aggregation.

11. The electronic device according to claim 10, wherein the radio resource aggregation corresponds to aggregation of carriers, and in case that carriers belonging to a candidate base station are of different characteristics, a performance of a best carrier in the carriers according to the measurement report is used to determine the priority of the candidate base station, the better the performance of the best carrier, the higher priority of the candidate base station to be selected as the target base station.

12. The electronic device according to claim 10, wherein the radio resource aggregation corresponds to aggregation of carriers, and in case that carriers belonging to a candidate base station are of similar characteristics, a weighted sum of performances of the carriers according to the measurement report is used to determine the priority of the candidate base station, the better the weighted sum of performances, the higher priority of the candidate base station to be selected as the target base station.

13. The electronic device according to claim 9, wherein the radio resource aggregation corresponds to aggregation of carriers, and in case that carriers belonging to the target base station are of different characteristics, configuration information of one or more carriers in the carriers is packet in a handover command to the target base station.

14. The electronic device according to claim 9, wherein the radio resource aggregation corresponds to aggregation of carriers, and in case that carriers belonging to the target base station are of similar characteristics, configuration information of all the carriers is packet in a handover command to the target base station.

15. The electronic device according to claim 9, wherein the radio resource aggregation corresponds to aggregation of carriers, and the multiple manners of radio resource aggregation in the radio communication system comprises aggregation of carriers in same frequency band and aggregation of carriers in different frequency bands.

16. The electronic device according to claim 15, wherein the electronic device is implemented as a terminal device and the electronic device further comprises a communication interface, configured to receive the radio resource control connection reconfiguration message from the base station, wherein a handover command adaptive to the manner of radio resource aggregation is transmitted by the base station to the target base station for an acknowledge message from the target base station before receiving the radio resource control connection reconfiguration message.

17. A method in a radio communication system, comprising:

acquiring a measurement report of performances of measurement objects from a terminal device served by the electronic device; and determining, based on the measurement report, a handover scheme adaptive to a manner of radio resource aggregation supported by a target base station to serve the terminal device, the manner of radio resource aggregation being one of multiple manners of radio resource aggregation in the radio communication system, further comprising selecting with circuitry the target base station from multiple candidate base stations according to a priority of each candidate base station which is determined adaptive to the manner of radio resource aggregation supported by each candidate base station.

18. A method in a radio communication system, comprising generating a measurement report of performances of measurement objects for a base station serving the electronic device; and acquiring a radio resource control connection reconfiguration message comprising mobility control information from the base station to handover to a target base station, wherein a handover scheme is determined, based on the measurement report, adaptive to a manner of radio resource aggregation supported by the target base station to serve the electronic device, the manner of radio resource aggregation being one of multiple manners of radio resource aggregation in the radio communication system, further comprising selecting with circuitry the target base station from multiple candidate base stations according to a priority of each candidate base station which is determined adaptive to the manner of radio resource aggregation supported by each candidate base station.

* * * * *